(12) United States Patent
Furukawa et al.

(10) Patent No.: US 11,152,870 B2
(45) Date of Patent: Oct. 19, 2021

(54) POWER CONVERSION DEVICE

(71) Applicant: Hitachi Industrial Products, Ltd., Tokyo (JP)

(72) Inventors: Kimihisa Furukawa, Tokyo (JP); Akihiko Kanouda, Tokyo (JP); Yuuichi Mabuchi, Tokyo (JP); Hiroyuki Shoji, Tokyo (JP); Takae Shimada, Tokyo (JP); Mitsuhiro Kadota, Tokyo (JP); Mizuki Nakahara, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 0 days.

(21) Appl. No.: 16/964,105

(22) PCT Filed: Oct. 4, 2018

(86) PCT No.: PCT/JP2018/037263
§ 371 (c)(1),
(2) Date: Jul. 22, 2020

(87) PCT Pub. No.: WO2019/163185
PCT Pub. Date: Aug. 29, 2019

(65) Prior Publication Data
US 2021/0044212 A1 Feb. 11, 2021

(30) Foreign Application Priority Data
Feb. 23, 2018 (JP) .............................. JP2018-030430

(51) Int. Cl.
*H02M 5/45* (2006.01)
*H02M 5/458* (2006.01)

(52) U.S. Cl.
CPC ........... *H02M 5/4585* (2013.01); *H02M 5/45* (2013.01)

(58) Field of Classification Search
CPC ............ H02M 5/40; H02M 5/44; H02M 5/45; H02M 5/453; H02M 5/458; H02M 5/4585; H02M 5/22; H02M 7/48; H02J 3/34
See application file for complete search history.

(56) References Cited

U.S. PATENT DOCUMENTS

| | | | | |
|---|---|---|---|---|
| 6,388,416 | B1 * | 5/2002 | Nakatani | H02P 6/085 318/700 |
| 2014/0016379 | A1 * | 1/2014 | Yamamoto | H02M 7/483 363/37 |
| 2017/0133921 | A1 | 5/2017 | Okumura et al. | |

FOREIGN PATENT DOCUMENTS

| | | |
|---|---|---|
| JP | 2015-230555 A | 12/2015 |
| JP | 2016-19367 A | 2/2016 |

(Continued)

OTHER PUBLICATIONS

International Preliminary Report on Patentability (PCT/IB/338 & PCT/IB/373) issued in PCT Application No. PCT/JP2018/037263 dated Sep. 3, 2020, including English translation of document C2 (Japanese-language Written Opinion (PCT/ISA/237) previously filed on Jul. 22, 2020) (six (6) pages).

(Continued)

*Primary Examiner* — Adolf D Berhane
(74) *Attorney, Agent, or Firm* — Crowell & Moring LLP

(57) ABSTRACT

A power conversion device that suppresses voltage pulsation of a capacitor of a power converter with respect to a control target whose effective power is to be controlled is provided. The power conversion device includes a plurality of power conversion cells that are connected to each other, and convert a primary-side system voltage into a secondary-side system voltage, a capacitor that is connected to each of the plurality of power conversion cells, and a power conversion cell driver that drives the power conversion cells to add a 3N (Continued)

order higher-harmonic-wave voltage of each of alternating voltages of the plurality of power conversion cells to the each of alternating voltages, and output a voltage made by adding the each of alternating voltages and the 3N order higher-harmonic-wave voltage, when N is a natural number.

8 Claims, 17 Drawing Sheets

(56) References Cited

FOREIGN PATENT DOCUMENTS

| | | |
|---|---|---|
| JP | 2017-147812 A | 8/2017 |
| WO | WO 2016/177399 A1 | 11/2016 |

OTHER PUBLICATIONS

International Search Report (PCT/ISA/210) issued in PCT Application No. PCT/JP2018/037263 dated Dec. 11, 2018 with English translation (four (4) pages).

Japanese-language Written Opinion (PCT/ISA/237) issued in PCT Application No. PCT/JP2018/037263 dated Dec. 11, 2018 (three (3) pages).

* cited by examiner

POWER CONVERSION DEVICE

TECHNICAL FIELD

The present invention relates to a power conversion device.

BACKGROUND ART

As a power conversion device, a self-excited reactive power control device described in Patent Document 1 is available.

Patent Document 1 describes that in a self-excited reactive power control device in which a capacitor connected to a direct-current (DC) side of a single-phase power converter generates reactive power as a DC voltage source, the self-excited reactive power control device being directly connected to a three-phase alternating-current (AC) system while providing single-phase power converters for three phases, higher-harmonic-wave voltages of multiples of 3 are superimposed on output voltages of the single-phase power converters with the same phase at each phase (refer to a paragraph 0006 in the specification).

PRIOR ART DOCUMENT

Patent Document

Patent Document 1: JP-2015-230555-A

SUMMARY OF THE INVENTION

Problem to be Solved by the Invention

For example, a converter cell described in Patent Document 1 is a so-called self-excited reactive power control device that converts a reactive current of a power supply system into an operation for charging/discharging a capacitor connected to a DC side of a single-phase converter, and applies a reactive voltage to a power system by outputting the reactive voltage from an AC side of the single-phase converter.

Herein, a ripple component that fluctuates at a frequency of the power supply system is superimposed on a DC voltage across capacitor terminals. When this ripple component is large, capacitor-terminal voltage fluctuation is increased, which is problematic.

The invention described in Patent Document 1 is an invention for reducing the ripple component while controlling a power conversion device and the converter cell so as not to increase their sizes and cost without increasing a size of a component such as a capacitor.

However, the invention described in Patent Document 1 is a method for the self-excited reactive power control device, and therefore it cannot immediately be applied to a control target whose active power is to be controlled.

The present invention is made in consideration of the situation described above, and the object of the present invention is to achieve a power conversion device that can suppress voltage pulsation of a capacitor of a power converter, reduce a loss of the capacitor, and as a result reduce a capacity or a volume with low cost, with respect to a control target whose active power is to be controlled.

Means for Solving the Problem

To achieve the above-described object, the present invention is configured as follows.

A power conversion device includes: a plurality of power conversion cells that are connected to each other and convert a primary-side system voltage into a secondary-side system voltage; a capacitor that is connected to each of the plurality of power conversion cells; and a power conversion cell driver that drives the plurality of power conversion cells to add a 3N order higher-harmonic-wave voltage of each of AC voltages of the plurality of power conversion cells to the each of AC voltages, and output a voltage made by adding the each of AC voltages and the 3N order higher-harmonic-wave voltage, when N is a natural number.

Advantageous of the Invention

According to the present invention, a power conversion device that can suppress voltage pulsation of a capacitor of a power converter, reduces a loss of the capacitor, and as a result, reduces a capacity or a volume of the capacitor with low cost can be achieved.

MODES FOR CARRYING OUT THE INVENTION

Hereinafter, embodiments of the present invention will be described with reference to attached drawings.

EMBODIMENTS

First Embodiment (Configuration of First Embodiment)

First, a configuration of a power conversion device according to a first embodiment of the present invention will be described.

Figure 1:
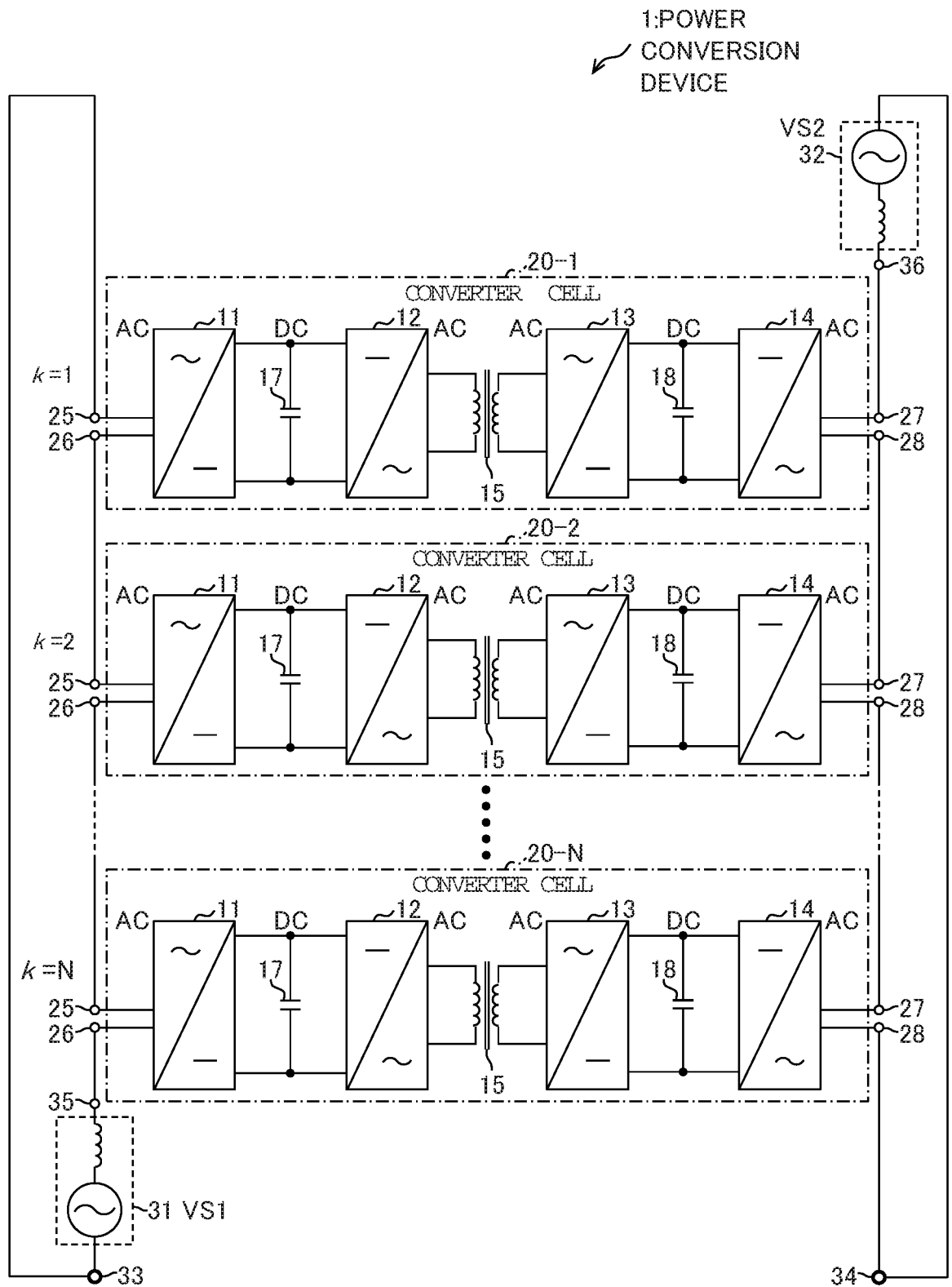
FIG. 1 is a block diagram of a power conversion device 1 according to a first embodiment of the present invention.

FIG. 1 is a block diagram of a power conversion device 1 according to the first embodiment of the present invention.

In FIG. 1, the power conversion device 1 includes N converter cells 20-1 to 20-N (N is a natural number more than or equal to two). Each converter cell 20-$k$ (k is a step number, and satisfies 1≤k≤N) includes a pair of primary-side terminals 25 and 26, a pair of secondary-side terminals 27 and 28, an AC-DC converter 11 (a first AC-DC converter that converts an AC voltage serving as the primary-side system voltage into a DC voltage: a primary-side converter), an AC-DC converter 12 (a second AC-DC converter that converts the DC voltage converted by the first AC-DC converter into an AC voltage: the primary-side converter), an AC-DC converter 13 (a third AC-DC converter that converts the AC voltage converted by the second AC-DC converter into an DC voltage: a secondary-side converter), an AC-DC converter 14 (a fourth AC-DC converter that converts the DC voltage converted by the third AC-DC converter into an AC voltage and outputs the AC voltage to a secondary-side power supply system: the secondary-side converter), a high-frequency transformer 15 (transformer) connected between the AC-DC converter 12 and the AC-DC converter 13, a capacitor 17 (first capacitor), and a capacitor 18 (second capacitor).

The capacitor 17 is connected between the AC-DC converters 11 and 12, and the capacitor 18 is connected between the AC-DC converters 13 and 14.

The primary-side terminals 25 and 26 of the converter cells 20-1 to 20-N are sequentially connected, and a primary-side power supply system 31 is connected to this series circuit. The secondary-side terminals 27 and 28 of the converter cells 20-1 to 20-N are sequentially connected to each other in series, and a secondary-side power supply system 32 is connected to the series circuit. Each of the converter cells 20-1 to 20-N transfers power between the primary-side terminals 25, 26 and the secondary-side terminals 27, 28 bidirectionally or unidirectionally.

It is supposed that each of the primary-side power supply system 31 and the secondary-side power supply system 32 involves inductive impedance or a filter reactor. As the primary-side power supply system 31 and the secondary-side power supply system 32, various power generation facilities and power receiving facilities such as a commercial power supply system, a solar power generation system, and a motor can be employed.

It is supposed that a voltage of the primary-side power supply system 31 is a primary-side system voltage VS1, and a voltage of the secondary-side power supply system 32 is a secondary-side system voltage VS2. The primary-side power supply system 31 and the secondary-side power supply system 32 are independent from each other in amplitude and frequency, and the power conversion device 1 transfers power between the primary-side power supply system 31 and the secondary-side power supply system 32 bidirectionally or unidirectionally.

As illustrated in FIG. 1, in a pair of terminals of the primary-side power supply system 31, one is referred to as a primary-side reference terminal 33, and the other is referred to as a terminal 35. Similarly, in a pair of terminals of the secondary-side power supply system 32, one is referred to as a secondary-side reference terminal 34, and the other is referred to as a terminal 36. The primary-side reference terminal 33 is a terminal at which primary-side reference potential appears, and the secondary-side reference terminal 34 is a terminal at which secondary-side reference potential appears. The primary-side reference potential and the secondary-side reference potential are ground potential, for example. However, the reference potential may not be necessarily the ground potential.

The primary-side reference terminal 33 is connected to the primary-side terminal 25 of the converter cell 20-1, and the terminal 35 is connected to the secondary-side terminal 26 of the converter cell 20-N. The secondary-side reference terminal 34 is connected to the secondary-side terminal 28 of the converter cell 20-N, and the terminal 36 is connected to the secondary-side terminal 27 of the converter cell 20-1.

Figure 2:
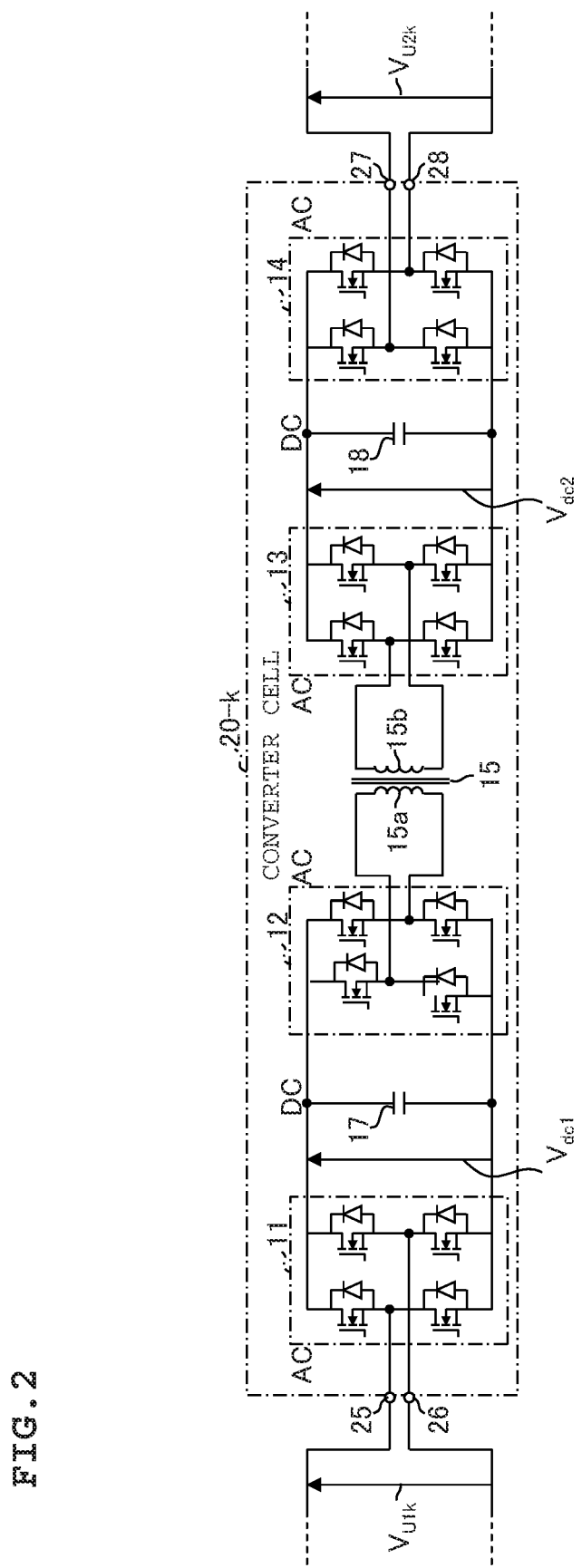
FIG. 2 is a block diagram (circuit diagram) of a converter cell.

FIG. 2 is a block diagram (circuit diagram) of the converter cell 20-$k$.

Each of the AC-DC converters 11 to 14 includes four switching elements connected in an H-bridge state and FWDs (Free Wheeling Diodes) connected in reversely parallel to those switching elements (both have no reference character).

Note that, in this first embodiment, those switching elements are MOSFETs (Metal-Oxide-Semiconductor Field-Effect Transistors), for example. A voltage that appears between both ends of the capacitor 17 is referred to as a primary-side DC link voltage $V_{dc1}$ (primary-side DC voltage).

Furthermore, a voltage that appears between the primary-side terminals 25 and 26 is referred to as a primary-side AC inter-terminal voltage $V_{U1k}$. The AC-DC converter 11 transfers power while converting the primary-side AC inter-terminal voltage $V_{U1k}$ and the primary-side DC link voltage $V_{dc1}$ bidirectionally or unidirectionally.

The high-frequency transformer 15 includes a primary winding 15a and a secondary winding 15b, and transfers power at a predetermined frequency between the primary winding 15a and the secondary winding 15b. A current in which the AC-DC converters 12 and 13 input or output from or to the high-frequency transformer 15 is of a high frequency. Herein, the high frequency is, for example, a frequency more than or equal to 100 Hz, a frequency more than or equal to 1 kHz is preferably employed, and a frequency more than or equal to 10 kHz is more preferably employed. The AC-DC converter 12 transfers power while converting the primary-side DC link voltage $V_{dc1}$ and a voltage that appears at the primary winding 15a bidirectionally or unidirectionally.

A voltage that appears between both ends of the capacitor 18 is referred to as a secondary-side DC link voltage $V_{dc2}$ (secondary-side DC voltage). The AC-DC converter 13 transfers power while converting the secondary-side DC link voltage $V_{dc2}$ and a voltage that appears at the secondary winding 15b bidirectionally or unidirectionally.

A voltage that appears between the secondary-side terminals 27 and 28 is referred to as a secondary-side AC inter-terminal voltage $V_{u2k}$. The AC-DC converter 14 transfers power while converting the secondary-side AC inter-terminal voltage $V_{u2k}$ and the secondary-side DC link voltage $V_{dc2}$ bidirectionally or unidirectionally.

In FIG. 1, assuming that an amplitude value of the primary-side system voltage VS1 is $V_{max}$, and that the primary-side DC link voltage $V_{dc1}$ of each converter cell 20-$k$ is 1/N of the amplitude value $V_{max}$, the primary-side AC inter-terminal voltage $V_{U1k}$ illustrated in FIG. 2 is any one of voltages of $\pm V_{max}/N$ and 0. The same is applied to the secondary-side, and therefore description thereof is omitted.

Figure 3:
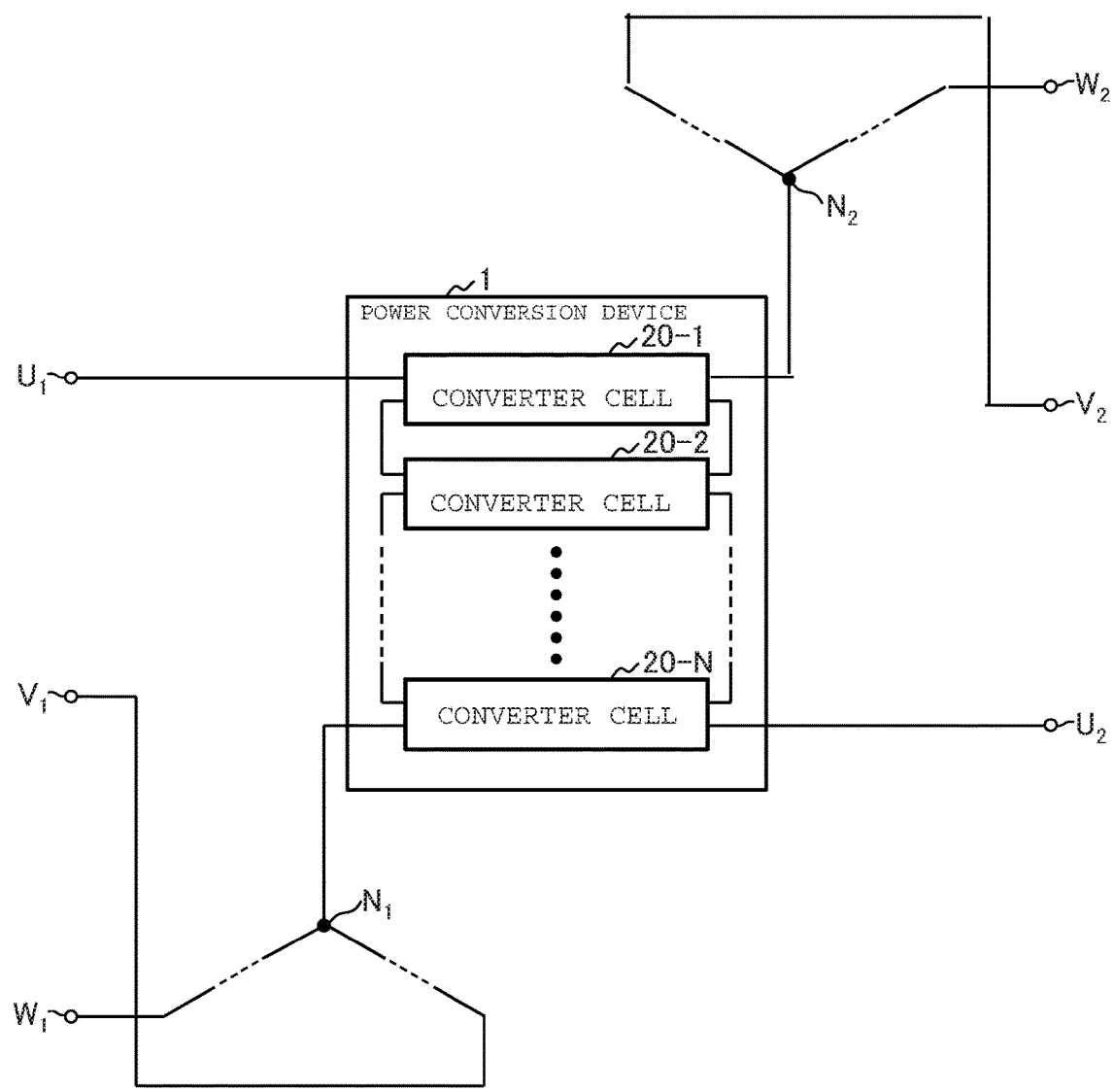
FIG. 3 is a block diagram of a configuration of a three-phase AC system in the first embodiment.

FIG. 3 is a block diagram of a three-phase AC system, and the three-phase AC system is configured with the converter cells 20-1 to 20-N illustrated in FIG. 1 and FIG. 2.

In FIG. 3, terminals of a U-phase, a V-phase, and a W-phase of a primary-side three-phase power supply system are defined as U1, V1, and W1, respectively, and terminals of a U-phase, a V-phase, and a W-phase of a secondary-side three-phase power supply system are defined as U2, V2, and W2, respectively. Neutral points of those systems are defined as N1, and N2. In the three-phase AC system illustrated in FIG. 3, the neutral points N1 and N2 serve as the primary-side and secondary-side reference terminals, respectively. The primary-side terminals 25 and 26 of the converter cells 20-1 to 20-N (refer to FIG. 1 and FIG. 2) are sequentially connected in series between the terminal U1 and the neutral point N1 on the primary-side. Further, the secondary-side terminals 27 and 28 of the converter cells 20-1 and 20-N are sequentially connected in series between the neutral point N2 and the terminal U2 on the secondary-side.

Although illustration is omitted, the power conversion devices 1 are connected to the V-phase and the W-phase similar to the U-phase.

Figure 4A:
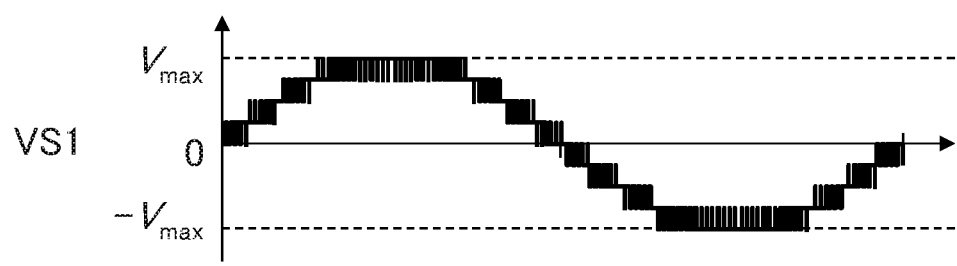
FIG. 4A is a diagram illustrating an example of a waveform of a primary-side system voltage.
Figure 4B:
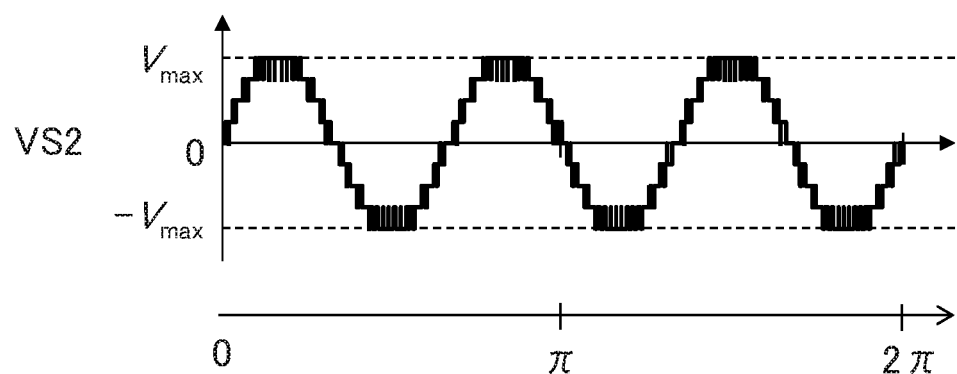
FIG. 4B is a diagram illustrating an example of a waveform of a secondary-side system voltage.

FIG. 4A is an example of a waveform diagram of the primary-side system voltage VS1. FIG. 4B is an example of a waveform diagram of the secondary-side system voltage VS2.

For simplicity of description, the following examples focus on the primary-side.

As described above, the primary-side AC inter-terminal voltage $V_{u1k}$ of each converter cell is any one of voltages of $\pm V_{max}/N$ and 0, and accordingly a waveform of the voltage $V_{u1k}$ exhibits a state of three-level PWM (the state differs depending on a modulation method, but Phase Shift PWM (PSPWM) is supposed herein). Hereinafter, a derivation process of the voltage $V_{u1k}$ for minimizing a current loss of the capacitor 17. However, for simplicity of discussion, influence of the PWM is neglected, and the voltage $V_{u1k}$ is approximated as a continuous waveform. In other words, an actual voltage $V_{u1k}$ is modulated by a carrier such as a triangular wave carrier and pulsed, but a signal before the modulation will be discussed herein.

When a fundamental wave voltage of a three-phase AC is of amplitude $V_{max}/N=V0$, and an angular frequency $\omega_0$, a compensation voltage of $V_0*a(t)$ is superimposed on the fundamental wave voltage, thereby achieving a method for minimizing a capacitor loss. Herein a(t) is an optional function, and the function a(t) is derived based on the following consideration. Herein the function a(t) is defined as a loss-minimizing function.

A current is of amplitude $V_0$, an angular frequency $\omega_0$, and a phase $\psi$, and the following expression (1) and expression (2) describe the voltage and the current, respectively, as follows.

$V_{U1k}(\omega_0 t) = V_0 \sin \omega_0 t + V_0 \cdot a(t)$ [Expression 1]

$I_{U1}(\omega_0 t) = I_0 \sin(\omega_0 t - \varphi)$ [Expression 2]

Primary-side instantaneous power $P_{U1k}(\omega_0 t)$ of the converter cell 20-$k$ is expressed by the following expression (3) by multiplying the expression (1) by the expression (2).

$$P_{U1k}(\omega_0 t) = V_{U1k}(\omega_0 t) \cdot I_{U1}(\omega_0 t) \quad \text{[Expression 3]}$$
$$= \frac{V_0 I_0}{2}\{\cos\varphi - \cos(2\omega_0 t - \varphi) + 2a(t)\sin(\omega_0 t - \varphi)\}$$

Next, consider to extend this discussion to other phases.

Instantaneous power of the v-phase and instantaneous power of the W-phase are derived by shifting the phase of $P_{U1k}(\omega_0 t)$ in the above expression (3) by $\pm(2/3)\pi$ [rad.], resulting in the following expressions (4) and (5).

$P_{V1k}(\omega_0 t) = P_{U1k}(\omega_0 t - 2/3\pi)$ [Expression 4]

$P_{W1k}(\omega_0 t) = P_{U1k}(\omega_0 t + 2/3\pi)$ [Expression 5]

Furthermore, an inflow current $I_{U1kdc}$ in a DC link portion to which the capacitor is disposed is calculated. Assuming that capacitor-terminal voltages are equal in cell converters and are $V_{dc1}$, the current $I_{U1kdc}$ can be obtained as the following expression (6), by dividing the instantaneous power $P_{U1k}(\omega_0 t)$ by the capacitor-terminal voltage $V_{dc1}$.

$$I_{U1kdc} = \frac{P_{U1k}(\omega_0 t)}{V_{dc1}} \quad \text{[Expression 6]}$$

Herein, for simplicity of the following calculations, the inflow current $I_{U1kdc}$ in the DC link portion is normalized as the following expression (7).

$\tilde{I}_{U1kdc} = \cos\varphi - \cos(2\omega_0 t - \varphi) + 2a(t)\sin(\omega_0 t - \varphi)$ [Expression 7]

Then, the expression (7) is led to the following expression (8).

$$\tilde{I}_{U1kdc} = \frac{I_{U1kdc} \cdot 2V_{dc}}{V_0 I_0} \quad \text{[Expression 8]}$$

Herein, assuming that an outflow current in the U-phase DC link portion is a DC component, $\cos \psi$ serves as the outflow current in the U-phase DC link portion in the above expression (8). In other words, an inflow current in the U-phase capacitor is an AC component in the above expression (8), and thus is expressed as the following expression (9).

$\tilde{I}_{U1kdC} = -\cos(2\omega_0 t - \varphi) + 2a(t)\sin(\omega_0 t - \varphi)$ [Expression 9]

Since an instantaneous loss of the U-phase capacitor is proportional to a square value of the inflow current in the U-phase capacitor, which is indicated in the left side of the above expression (9), a square value of the left side of the above expression (9) is expanded as the following expressions (10).

$\tilde{I}_{U1kdc}^2 = \cos^2\varphi + \cos^2(2\omega_0 t - \varphi) + 4a^2(t)\sin^2(\omega_0 t - \varphi) + 4a(t)\cos\varphi\sin(\omega_0 t - \varphi)$ $\tilde{I}_{U1kC}^2 = \cos^2(2\omega_0 t - \varphi) + 4a^2(t)\sin^2(\omega_0 t - \varphi) - 4a(t)\cos(2\omega_0 t - \varphi)\sin(\omega_0 t - \varphi)$ [Expressions 10]

The above expressions (10) include a DC component and a low order higher-harmonic-wave component other than the fundamental wave component $\omega_0 t$.

Herein, when focusing on a sum of three-phase instantaneous current losses of the U-, V-, and W-phases, the sum is simply sorted in order as the following expression (11). Hereinafter, a problem for minimizing a sum of capacitor losses of three-phase converters of the U-, V-, and W-phases will be addressed. Such an approach is no problem because the purpose herein is to minimize an entire loss of the converters.

$$\tilde{I}_{U1kC}^2 + \tilde{I}_{V1kC}^2 + \tilde{I}_{W1kC}^2 = 3/2 + 6a^2(t) - 6a(t)\sin(3\omega_0 t - 2\varphi) \quad \text{[Expression 11]}$$

The right side of the above expression (11) is a quadratic equation regarding a. Minimizing the instantaneous loss is equal to minimizing the right side in the expression (11), and $a(t) = a_{Lossmin}(t)$ at this time is expressed as the following expression (12).

$$a_{Lossmin}(t) = \tfrac{1}{2}\sin(3\omega_0 t - 2\varphi) \quad \text{[Expression 12]}$$

That is, the phase voltage $V_{U1k} = V_{U1kLossmin}$ that minimizes the sum of losses of the three-phase capacitors is expressed by the following expression (13) by inserting the above expression (12) to the above expression (4).

$$V_{U1k} = V_0 \sin \omega_0 t + \tfrac{1}{2} V_0 \sin(3\omega_0 t - 2\varphi) \quad \text{[Expression 13]}$$

When the fundamental wave voltage of the three-phase AC has the amplitude $V_0$ and the angular frequency $\omega_0$, the fact in which the capacitor loss can be minimized by superimposing the third order higher-harmonic wave voltage on the fundamental wave voltage has been derived with the above expression (13).

Herein, the compensation voltage needs following Conditions 1 to 3.

Condition 1: the compensation voltage is provided with an angular frequency $3\omega_0$, that is, the third order higher-harmonic wave component.

Condition 2: the amplitude of the compensation voltage is provided with ½ of the fundamental wave voltage.

Condition 3: an alternating voltage provided as the compensation voltage is provided by being delayed by an angle $2\psi$.

Note that, herein, the delay in Condition 3 is a delay with $\sin(3\omega_0 t)$ as a reference. Further, the compensation voltage satisfies Condition 1 by being provided with not only the third order higher-harmonic wave component but also a 3N order higher-harmonic-wave component, in a case where N is a natural number.

The phase voltages including the V-phase and W-phase compensation voltages are derived by shifting the phase in the above expression (13) by $\pm(\tfrac{2}{3})\pi$ [rad.], resulting in the following expressions (14), (15).

$$V_{V1k} = V_0 \sin(\omega_0 t - \tfrac{2}{3}\pi) + \tfrac{1}{2} V_0 \sin(3\omega_0 t - 2\varphi) \quad \text{[Expression 14]}$$

$$V_{W1k} = V_0 \sin(\omega_0 t + \tfrac{2}{3}\pi) + \tfrac{1}{2} V_0 \sin(3\omega_0 t - 2\varphi) \quad \text{[Expression 15]}$$

The compensation voltage in a second term of the right side of each of the above expressions (13) to (15) is of the third order higher-harmonic wave, and therefore all three phases of U1, V1, and W1 provide the same compensation amount.

The above expressions (13), (14) and (15) represent the voltages for one cell among the converter cells 20-1 to 20-N, and therefore the phase voltages of the N-stage converter cells 20-1 to 20-N are expressed by the following expressions (16) to (18) from the relationship of $V_{max}/N = V_0$.

$$V_{U1} = V_{max} \sin \omega_0 t + \tfrac{1}{2} V_{max} \sin(3\omega_0 t - 2\varphi) \quad \text{[Expression 16]}$$

$$V_{V1} = V_{max} \sin(\omega_0 t + \tfrac{2}{3}\pi) + \tfrac{1}{2} V_{max} \sin(3\omega_0 t - 2\varphi) \quad \text{[Expression 17]}$$

$$V_{W1} = V_{max} \sin(\omega_0 t + \tfrac{2}{3}\pi) + \tfrac{1}{2} V_{max} \sin(3\omega_0 t - 2\varphi) \quad \text{[Expression 18]}$$

In other words, the compensation voltage in the second term of the right side of each of the above expressions (16) to (18) represents a neutral-point voltage, and is expressed as the following expression (19).

$$V_{N1} = \tfrac{1}{2} V_{max} \sin(3\omega_0 t - 2\varphi) \quad \text{[Expression 19]}$$

Using the compensation voltage of the third order higher-harmonic wave component described above as the output voltage of the cell converter in each phase reduces (halves) the loss.

Figure 5:
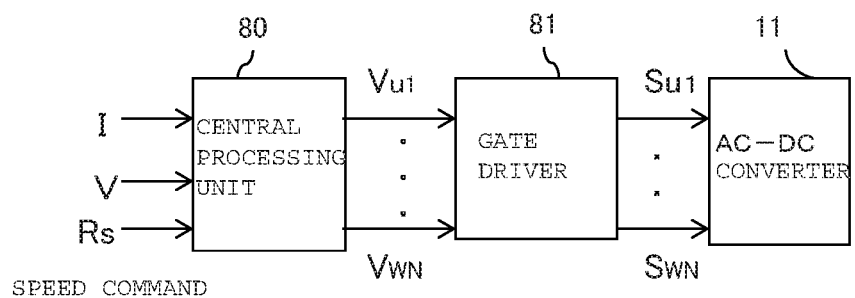
FIG. 5 is a block diagram for causing the converter cell to generate a phase voltage that minimizes a sum of losses of capacitors.

FIG. 5 is a block diagram of a power conversion cell driver to causes the converter cell to generate the phase voltage for minimizing the sum of the losses of the capacitors. In other words, FIG. 5 is a block diagram for controlling gates of the switching elements (MOSFETs) in the AC-DC converters 11 in the converter cells 20-1 to 20-N to provide the phase voltage added with the loss-minimizing function $a_{Lossmin}(t)$ indicated in the above expression (12). With reference to FIG. 5, control of the gates of the switching elements in the AC-DC converter 11 will be described. Note that the description will be made with an example for controlling an electric motor by the secondary-side power supply system.

In FIG. 5, a central processing unit 80 receives a current value I and a voltage value V on the primary-side, and an electric-motor rotation speed command Rs. Note that the current value I and the voltage value V on the primary-side are indicated by unifying current values and voltage values of the U-phase, V-phase, and W-phase.

The central processing unit 80 operates a d-axis current command value Id and a q-axis current command value Iq from the rotation speed command value Rs, and operates a d-axis voltage command value Vd and a q-axis voltage command value Vq from the d-axis current command value Id and the q-axis current command value Iq thus operated.

The two phases are converted into the three phases by using the voltage phase $\omega_0 t$ to operate voltage values Vu, Vv, and Vw.

Further, the central processing unit 80 operates a power factor angle (phase $\psi$) of the primary-side AC voltage by using the current value I and the voltage value V, and operates the loss-minimizing function a(t) indicated in the expression (12) by using the power factor angle (phase $\psi$) thus operated and $\omega_0 t$.

The voltage values Vu, Vv, and Vw are respectively added with the loss-minimized functions a(t) corresponding to their phases, and the voltage command values $V_{U1}$ to $V_{WN}$ corresponding to the above expression (13) are calculated. The voltage command values $V_{U1}$ to $V_{WN}$ thus calculated are supplied to a gate driver 81, and are converted into gate control signals $S_{U1}$ to $S_{WN}$ for the switching elements in the AC-DC converter 11, and then the converted signals are supplied to the AC-DC converter 11. The central processing unit 80 and the gate driver 81 configure the power conversion cell driver.

Herein, a reason why the loss is halved will be described.

(I) First, losses (for three phases) when the compensation voltages are not given will be considered. At this time, since a(t)=0 is satisfied, the following expression (20) is obtained from the above expression (11).

$$\tilde{I}_{U1kC}^2 + \tilde{I}_{V1kC}^2 + \tilde{I}_{W1kC}^2 = 3/2 \quad \text{[Expression 20]}$$

(II) Next, losses (for three phases) when the compensation voltages are given will be considered. At this time, a(t) is indicated in the above expression (12), and therefore the losses are expressed by the following expression (21) from the above expression (11).

$$\tilde{I}_{U1kC}^2 + \tilde{I}_{V1kC}^2 + \tilde{I}_{W1kC}^2 = 3/4 + 3/4 \cos(6\omega_0 t - 4\varphi) \quad \text{[Expression 21]}$$

In this case, the above expression (21) that represents the instantaneous loss varies at a frequency being six times. When an average loss during one period of $\omega_0 t = 2\pi$ is considered, an AC component in the above expression (21) is cancelled, and the average loss is expressed by the following expression (22).

$$\text{Average}(\tilde{I}_{U1kC}^2 + \tilde{I}_{V1kC}^2 + \tilde{I}_{W1kC}^2) = 3/4 \quad \text{[Expression 22]}$$

It is understood that the above expression (22) takes a half value of the above expression (20).

That is, it is shown that the loss is halved.

The above matter will be described again in an organized manner with reference to FIG. 6.

Figure 6:
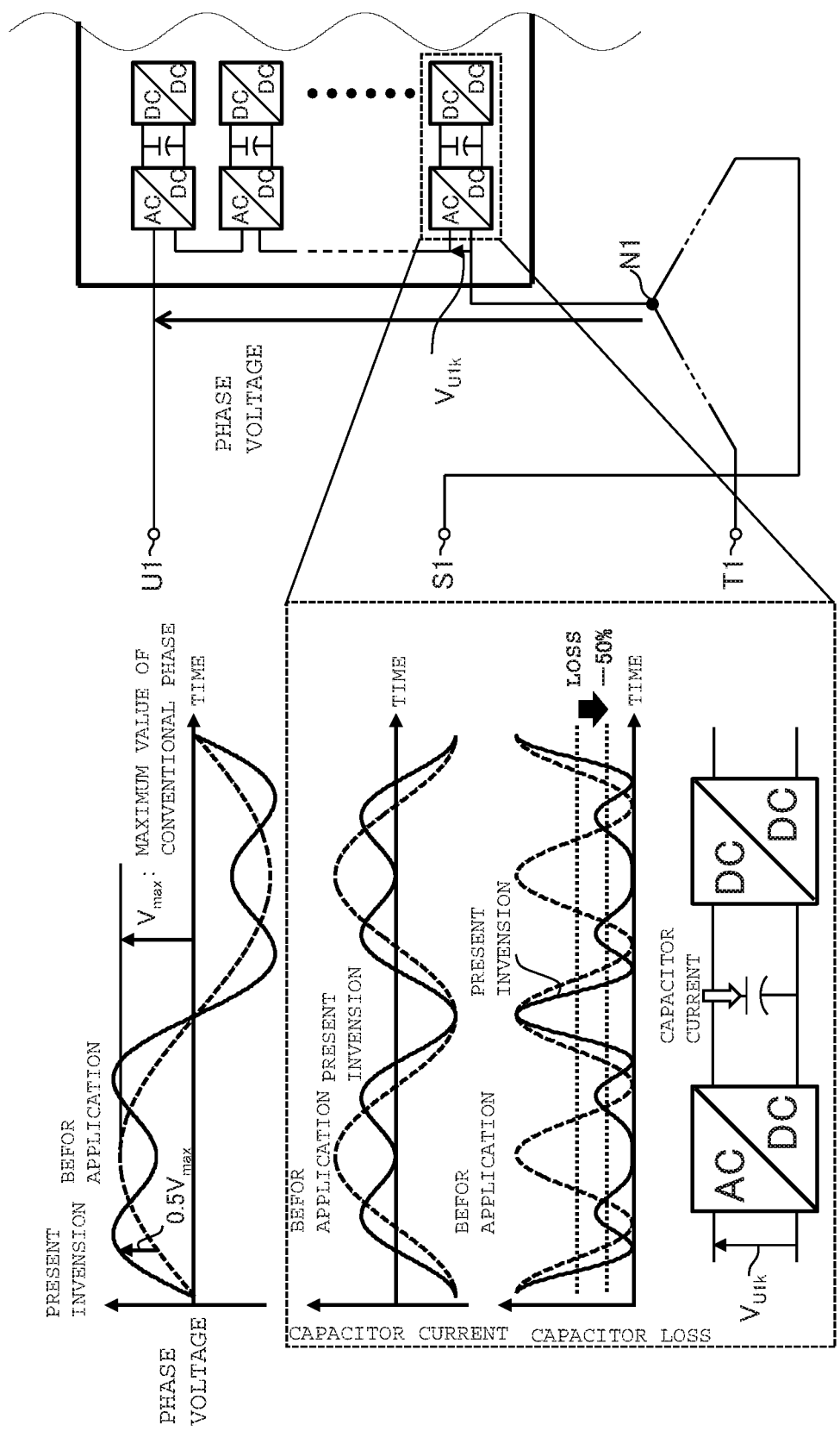
FIG. 6 is a conceptual diagram of the present invention.

FIG. 6 is a diagram illustrating an image in which the converter cells 20-*k* illustrated in FIG. 2 are connected in multiple stages, and particularly focuses on the primary-side to illustrate.

The phase voltage (a voltage between the phase and the neutral point) of the U1-phase illustrated in FIG. 6 is a sinusoidal wave indicated by a broken line, that is, $V_{max} \sin \omega_0 t$ before the present invention is applied.

The capacitor current in the converter cell 20-*k* at this time is a sinusoidal wave of a $2\omega_0$ component, and the capacitor loss is a sinusoidal wave of a $4\omega_0$ component. All waveforms before the present invention is applied are indicated by broken lines.

On the contrary, the phase voltage according to the first embodiment of the present invention turns a waveform indicated by the above expression (16), and the capacitor current and the capacitor loss of each converter cell 20-*k* also follow this waveform. It is then understood that the average value of the capacitor loss is halved from the value before the present invention is applied.

As described above, an effect for halving the capacitor loss is indicated.

Figure 7:
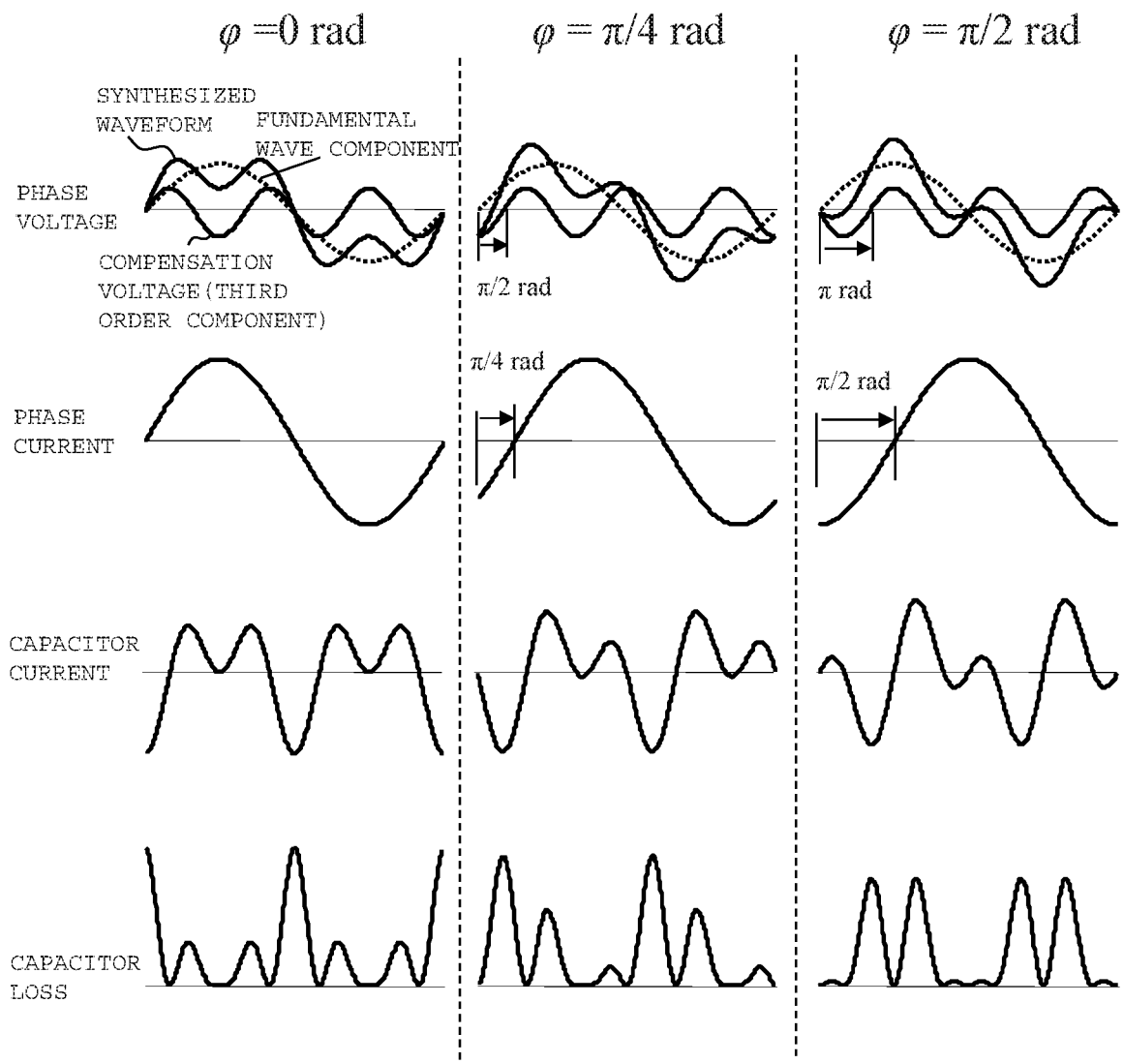
FIG. 7 is a diagram illustrating waveform examples and effects of the present invention under different conditions of a power factor angle.

Note that an example illustrated in FIG. 6 is a waveform example with the power factor being 1, that is, the power factor angle ψ being 0 [rad]. The present method is valid at any power factor angle ψ, and such states are illustrated in FIG. 7. FIG. 7 illustrates waveform examples of the phase voltage, the phase current, the capacitor current, and the capacitor loss, in each of cases of power factor angle ψ=0 [rad], ψ=π/4 [rad], and ψ=π/2 [rad].

As described above, the first embodiment of the present invention is configured such that the phase voltage is added with the loss-minimizing function a(t) that minimizes the sum of capacitor losses, and the AC-DC converter 11 is controlled to achieve this phase voltage. Therefore, with respect to a control target whose active power is to be controlled, voltage pulsation of a capacitor of a power converter can be suppressed, and a capacitor loss can be reduced. As a result, a capacity or a volume of the capacitor can be reduced, thereby achieving a power conversion device with low cost.

It should be noted that the effect of the present invention can be exerted at the maximum with the amplitude and phase of the compensation voltage indicated in the converter cell voltages in the above expressions (13) to (15) or the phase voltages in the above expressions (16) to (18). However, this effect is still effective with amplitude and a phase, which are not necessarily those amplitude and phase, and therefore the present invention is not limited to the values described herein.

In other words, a case that only satisfies Condition 1 is also effective without satisfying all of above Conditions 1 to 3. In addition, a case that satisfies Condition 1 and Condition 2, and a case that satisfies Condition 1 and Condition 3 are also effective.

The primary-side AC inter-terminal voltage (AC voltage) is used as the ground potential of the voltage at the AC neutral point. Further, the above compensation voltage can be made by adding a voltage in which amplitude is approximately ½ of the amplitude of the fundamental wave of the phase voltage and the 3N order higher-harmonic-wave is included to the ground potential of the voltage at the AC neutral point.

In the foregoing, the discussion is made focusing on various voltages and currents on the primary-side. However, similar discussion can be also made with respect to the secondary-side, and is effective, but such discussion is omitted herein due to limited space.

Second Embodiment (Configuration of Second Embodiment)

Next, a second embodiment will be described.

Figure 8:
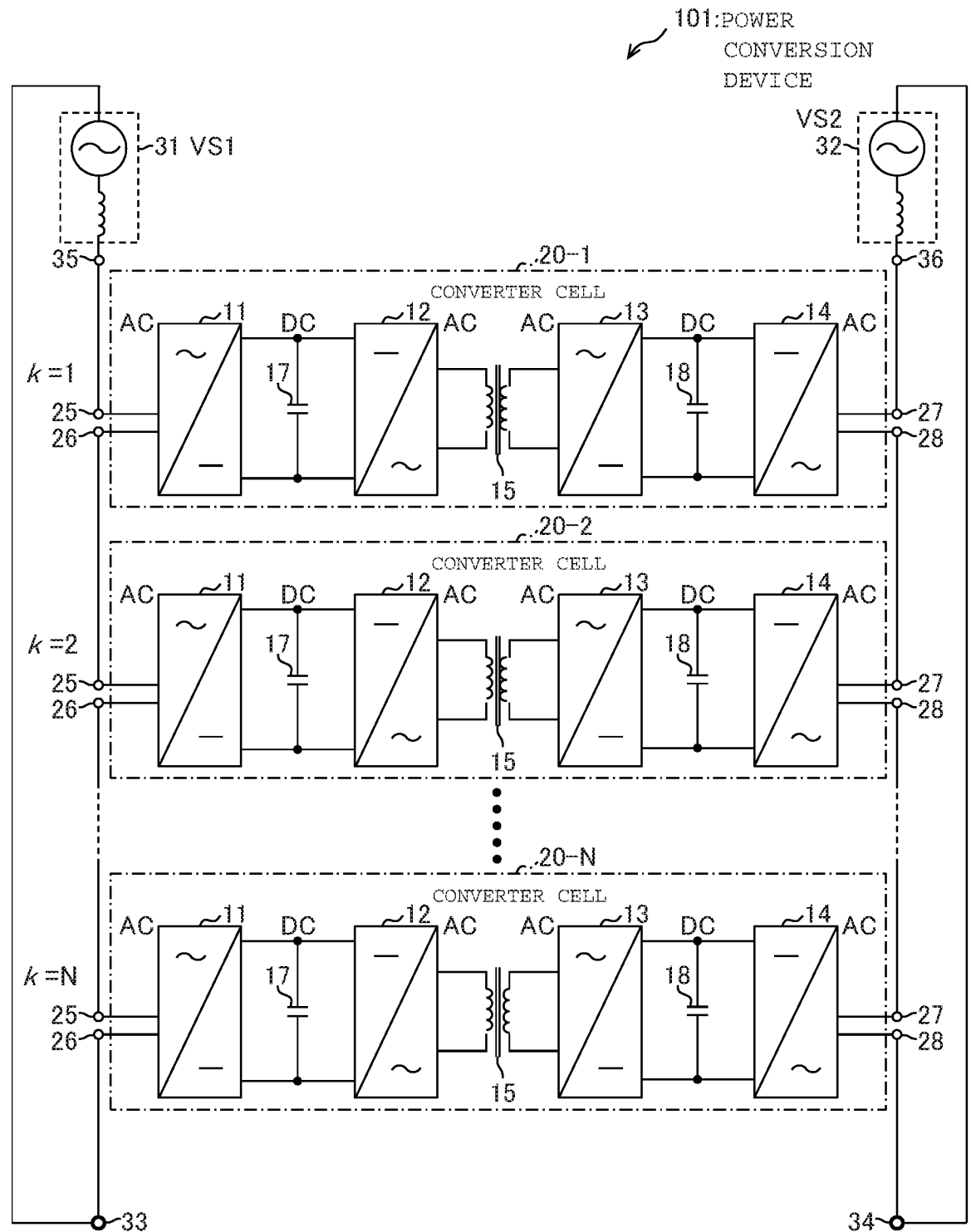
FIG. 8 is a block diagram of a power conversion device according to a second embodiment of the present invention.

FIG. 8 is a block diagram of a power conversion device 101 in the second embodiment.

In FIG. 8, similar to the power conversion device 1 in the first embodiment, the power conversion device 101 includes N converter cells 20-1 to 20-N. An internal configuration of each converter cell 20-*k* is also similar to that in the first embodiment (refer to FIG. 2). However, in the second embodiment, a connection method of the primary-side terminals 25 and 26 is different from that in the first embodiment. In other words, in the second embodiment, the primary-side reference terminal 33 is connected to the primary-side terminal 26 of the converter cell 20-N, and the terminal 35 on a higher-voltage-side of the primary-side power supply system 31 is connected to the primary-side terminal 25 of the converter cell 20-1.

Figure 9:
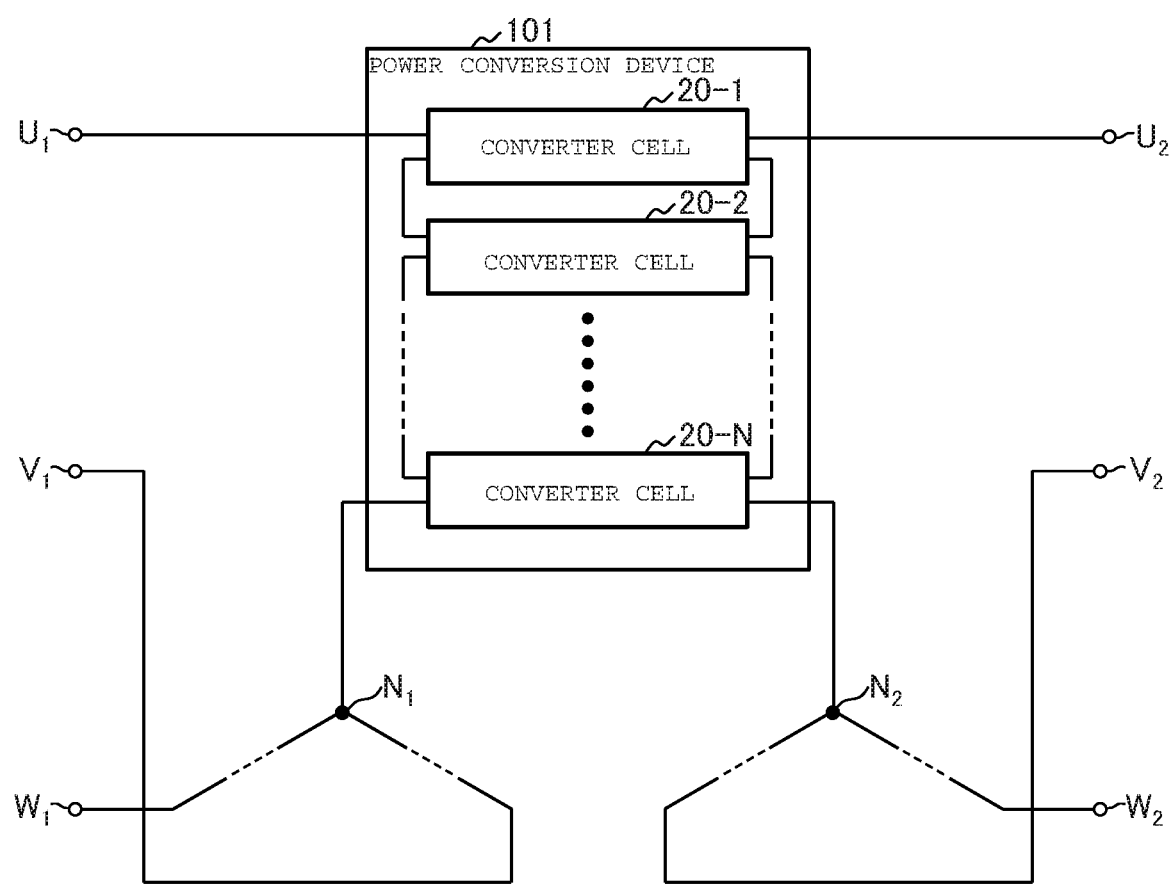
FIG. 9 is a block diagram of a configuration of a three-phase AC system in the second embodiment.

FIG. 9 is a block diagram configuring a three-phase AC system by combining the power conversion devices 101 in the second embodiment.

In FIG. 9, similar to the first embodiment (refer to FIG. 3), terminals of the U-phase, the V-phase, and the W-phase of the primary-side three-phase power supply system are defined as U1, V1, and W1, respectively, and terminals of the U-phase, the V-phase, and the W-phase of the secondary-side three-phase power supply system are defined as U2, V2, and W2, respectively. Neutral points of those systems are defined as N1, and N2.

In the second embodiment, the primary-side terminals 25 and 26 of the converter cells 20-1 to 20-N (refer to FIG. 8) are sequentially connected in series between the terminal U1 and the neutral point N1 on the primary-side. Further, the secondary-side terminals 27 and 28 (refer to FIG. 8) are sequentially connected in series between the terminal U2 and the neutral point N2 on the secondary-side.

Although illustration is omitted, the power conversion devices 101 are connected to the V-phase and the W-phase similar to the U-phase.

Other configurations are similar to those in the first embodiment, the central processing unit 80 and the gate driver 81, for example, illustrated in FIG. 5 are used to add the loss-minimizing function a(t) that minimizes the sum of losses of the capacitors to the phase voltage, and the AC-DC converter 11 is controlled to achieve this phase voltage. This configuration is common to the configuration in the first embodiment.

Also in the second embodiment, the control method based on the relationship with respect to various voltages and currents on the primary-side and the secondary-side and the expressions (13) to (19) is effective, similar to the first embodiment.

Accordingly, also with the second embodiment, the effect similar to the second embodiment can be obtained.

Third Embodiment

Next, a power conversion device according to a third embodiment will be described.

Figure 10:
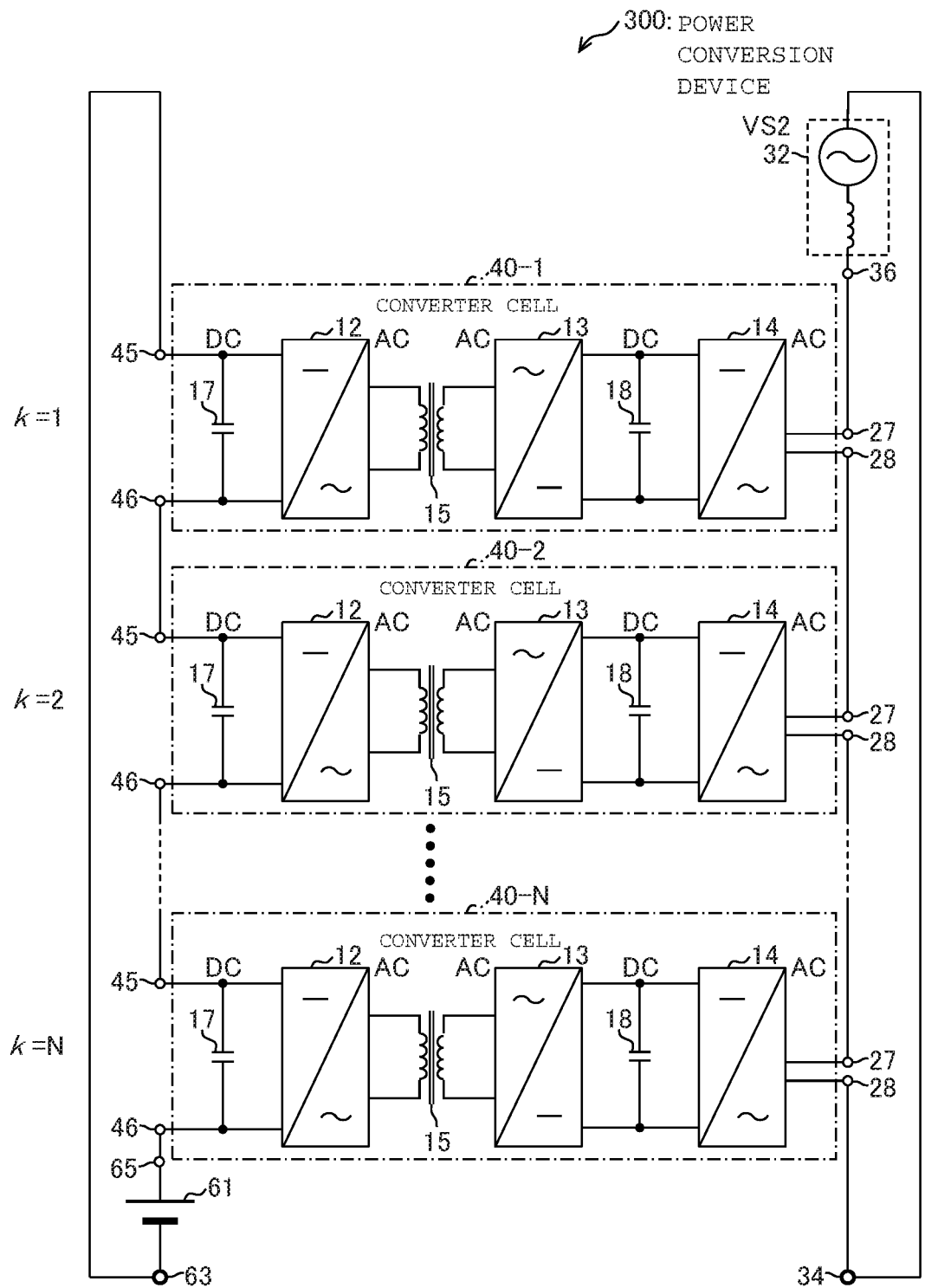
FIG. 10 is a block diagram of a power conversion device according to a third embodiment of the present invention.

FIG. 10 is a block diagram of a power conversion device 300 according to the third embodiment.

In FIG. 10, the power conversion device 300 includes N converter cells 40-1 to 40-N (N is a natural number more than or equal to two). A converter cell 40-$k$ (herein, 1≤k≤N) includes the AC-DC converters 12, 13 and 14, the capacitors 17 and 18, primary-side terminals 45 and 46, and the secondary-side terminals 27 and 28.

In the converter cell 40-$k$ of the third embodiment, a component corresponding to the AC-DC converter 11 in the first embodiment (refer to FIG. 2) is not provided, and both ends of the capacitor 17 are connected to the primary-side system terminals 45 and 46. Configurations of the converter cell 40-$k$ other than the above are similar to those in the first embodiment (refer to FIG. 2). In other words, the converter cell 40-$k$ bidirectionally or unidirectionally transfers power between a DC in the primary-side terminals 45, 46 and an AC in the secondary-side terminals 27, 28 while converting.

The primary-side terminals 45 and 46 of the converter cells 40-1 to 40-N are sequentially connected in series, and a primary-side DC power supply system 61 (primary-side power supply system) is connected to the series circuit. The secondary-side terminals 27 and 28 of the converter cells 20-1 to 20-N are sequentially connected in series, and a secondary-side AC power supply system 32 is connected to the series circuit. For example, DC power generation facilities such as batteries or various kind of DC loads can be used as the primary-side DC power supply system 61.

In a positive electrode terminal and a negative electrode terminal of the primary-side DC power supply system 61, one closer to the ground potential is referred to as a primary-side reference terminal 63 and the other is referred to as a terminal 65. In an example illustrated in FIG. 10, the negative electrode terminal of the primary-side DC power supply system 61 serves as the primary-side reference terminal 63. Similar to the first embodiment (refer to FIG. 1), in the pair of terminals of the secondary-side power supply system 32, a terminal closer to the ground potential is referred to as the secondary-side reference terminal 34 and the other is referred to as the terminal 36.

The primary-side reference terminal 63 is connected to the primary-side terminal 45 of the converter cell 40-1, and the secondary-side reference terminal 34 is connected to the secondary-side terminal 28 of the converter cell 40-N.

Figure 11:
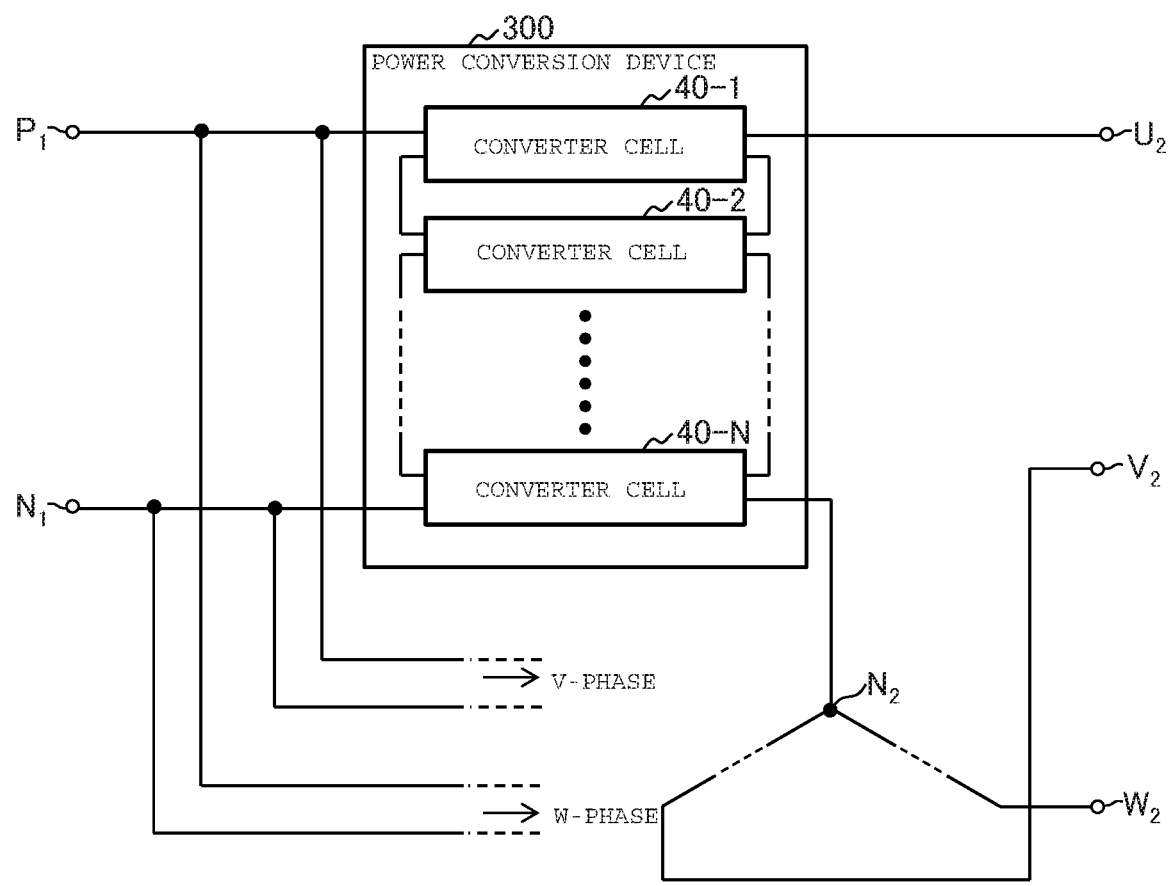
FIG. 11 is a block diagram of a configuration of a three-phase AC system in the third embodiment.

FIG. 11 is a block diagram configuring a three-phase AC system by combining the power conversion devices 300 in the third embodiment.

In FIG. 11, the third embodiment is different from the first embodiment and the second embodiment, the primary-side is connected to the DC power supply, its terminals are defined as P1 and N1, and terminals of the U-phase, V-phase, and W-phase in the secondary-side three-phase power supply system are defined as U2, V2, and W2, respectively. A neutral point of those phases is defined as N2 (note that N1 herein is different from the neutral points in the first embodiment and the second embodiment).

In the third embodiment, the primary-side terminals 45 and 46 of the converter cells 40-1 to 40-N (refer to FIG. 10) are sequentially connected in series between the terminal P1 and terminal N1 on the primary-side. The secondary-side terminals 27 and 28 (refer to FIG. 10) are sequentially connected in series between the terminal U2 and the neutral point N2 on the secondary-side.

Although illustration is omitted, the power conversion devices 300 are connected to the V-phase and the W-phase similar to the U-phase.

The first embodiment and the second embodiment are examples for reducing a loss with respect to the primary-side power supply. However, the primary-side power supply in the third embodiment includes DC quantity, and therefore the third embodiment is an example for reducing a loss with respect to the secondary-side power supply.

Therefore, in the third embodiment, a control method based on the relationship with respect to various voltages and currents on the secondary-side and the expressions (13) to (18) is effective. The central processing unit 80 illustrated in FIG. 5 causes the gate driver 81 to supply the gate control signals to the switching elements in the secondary-side AC-DC conversion device 13.

Also with the third embodiment, the effect similar to the first and second embodiments can be obtained.

Fourth Embodiment

Next, a power conversion device 110 according to a fourth embodiment will be described.

Figure 12:
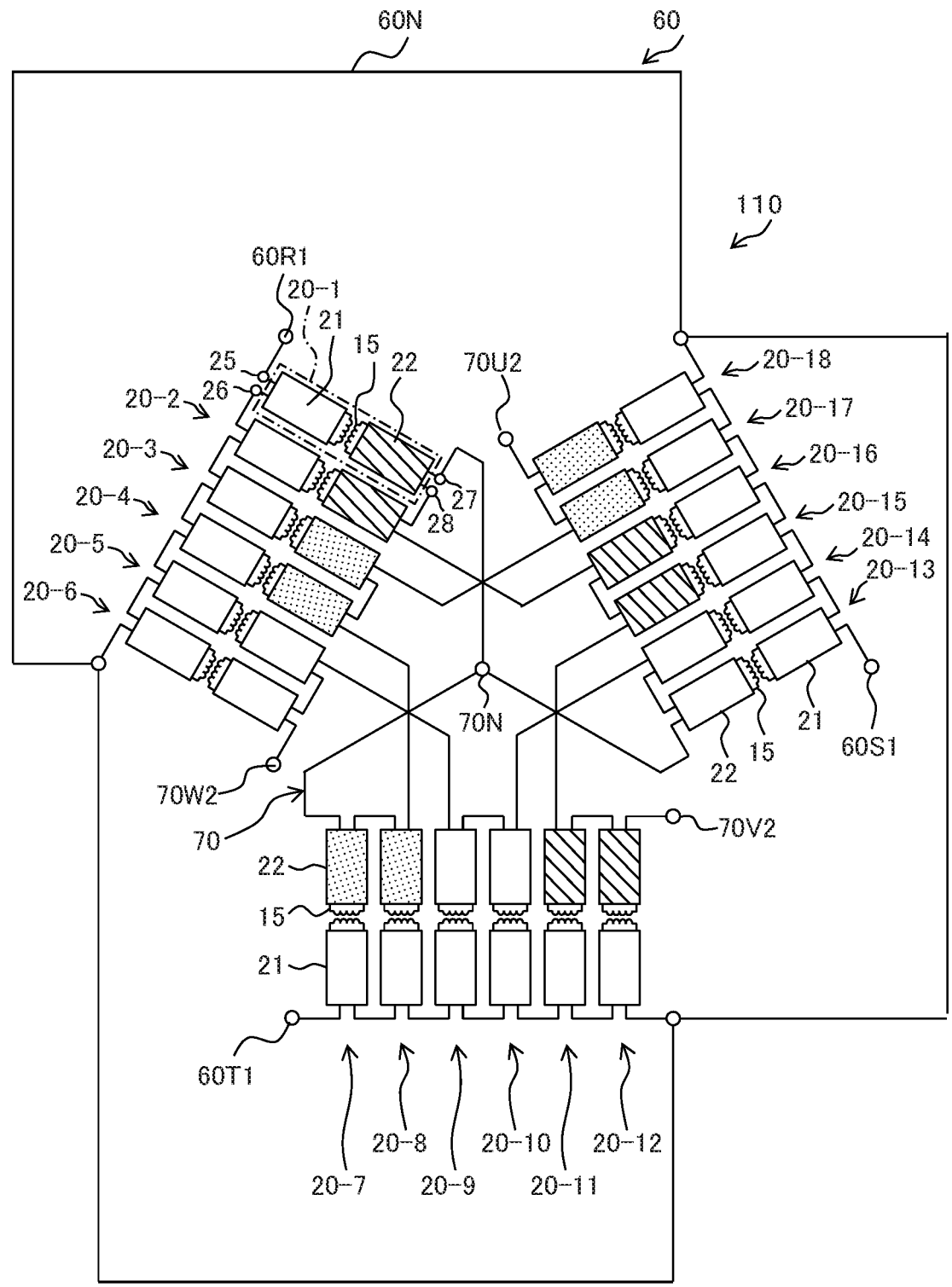
FIG. 12 is a block diagram of a power conversion device according to a fourth embodiment of the present invention.

FIG. 12 is a connection diagram of the power conversion device 110. As illustrated in FIG. 12, the power conversion device 110 includes eighteen converter cells 20-1 to 20-18. The converter cell 20-1 includes a primary-side circuit 21, a secondary-side circuit 22, and a high-frequency transformer 15. Configurations of the converter cells 20-2 to 20-18 are similar to those of the converter cell 20-1. Hereinafter, the converter cells 20-1 to 20-18 are collectively described as "converter cells 20," in some cases.

The power conversion device 110 bidirectionally or unidirectionally converts power between a primary-side system 60 and a secondary-side system 70 both of which are three-phase AC systems. Herein, the primary-side system 60 includes a neutral line 60N and an R-phase line 60R1, an S-phase line 60S1, and a T-phase line 60T1 in which an R-phase voltage, an S-phase voltage, and a T-phase voltage respectively appear. The secondary-side system 70 includes a neutral line 70N and a U-phase line 70U2, a V-phase line 70V2, and a W-phase line 70W2 in which a U-phase voltage, a V-phase voltage, and a W-phase voltage respectively appear.

The primary-side system 60 and the secondary-side system 70 are independent from each other in voltage amplitude, frequency, and phase. The R-phase voltage, the S-phase voltage, and the T-phase voltage mutually have phase differences of ($2\pi/3$) in a primary-side frequency, and the U-phase voltage, the V-phase voltage, and the W-phase voltage mutually have phase differences of ($2\pi/3$) in a secondary-side frequency. As the primary-side system 60 and the secondary-side system 70, various power generation facilities and power receiving facilities such as a commercial power supply system, a solar power generation system, and a motor can be employed.

Although the primary-side terminals 25 and 26 and the secondary-side terminals 27 and 28 of the converter cell 20-1 are illustrated, those of other converter cells 20-2 to 20-18 are omitted to be illustrated. The primary-side terminals 25 and 26 of the converter cells 20-1 to 20-6 are sequentially connected in series between the R-phase line 60R1 of the three-phase AC voltages and the neutral line 60N. Similarly, the primary-side terminals 25 and 26 of the converter cells 20-7 to 20-12 are sequentially connected in series between the T-phase line 60T1 of the three-phase AC voltages and the neutral line 60N. Similarly, the primary-side terminals 25 and 26 of the converter cells 20-13 to 20-18 are sequentially connected in series between the S-phase line 60S1 of the three-phase AC voltages and the neutral line 60N.

In FIG. 12, among the secondary-side circuits 22, circuits connected between the U-phase line 70U2 and the neutral line 70N are dotted. In other words, the converter cells 20-17 and 20-18 (ninth power conversion cells), the converter cells 20-3 and 20-4 (second power conversion cells), and the converter cells 20-7 and 20-8 (fourth power conversion cells) are connected in series between the U-phase line 70U2 of the three-phase AC voltages and the neutral line 70N.

Among the secondary-side circuits 22, circuits connected between the V-phase line 70V2 of the three-phase AC voltages and the neutral line 70N are hatched. In other words, the converter cells 20-11 and 20-12 (sixth power conversion cells), the converter cells 20-15 and 20-16 (eighth power conversion cells), and the converter cells 20-1 and 20-2 (first power conversion cells) are connected in series between the V-phase line 70V2 and the neutral line 70N.

Among the secondary-side circuits 22, circuits connected between the W-phase line 70W2 of the three-phase AC voltages and the neutral line 70N are outlined. In other words, the converter cells 20-5 and 20-6 (third power conversion cells), the converter cells 20-9 and 20-10 (fifth power conversion cells), and the converter cells 20-13 and 20-14 (seventh power conversion cells) are connected in series between the W-phase line 70W2 and the neutral line 70N. As described above, the power conversion device 110 connects the primary-side system 60 and the secondary-side system 70 with a Y-Y connection (Y-Y junction).

Also for those circuits, the control method based on the relationship with respect to various voltages and currents on the primary-side and the secondary-side and the expressions (13) to (18) is effective, similar to the first embodiment and the second embodiment.

The effect similar to that of the first embodiment can also be obtained with the fourth embodiment.

Fifth Embodiment

Next, a configuration of a power conversion device according to a fifth embodiment will be described.

Figure 13:
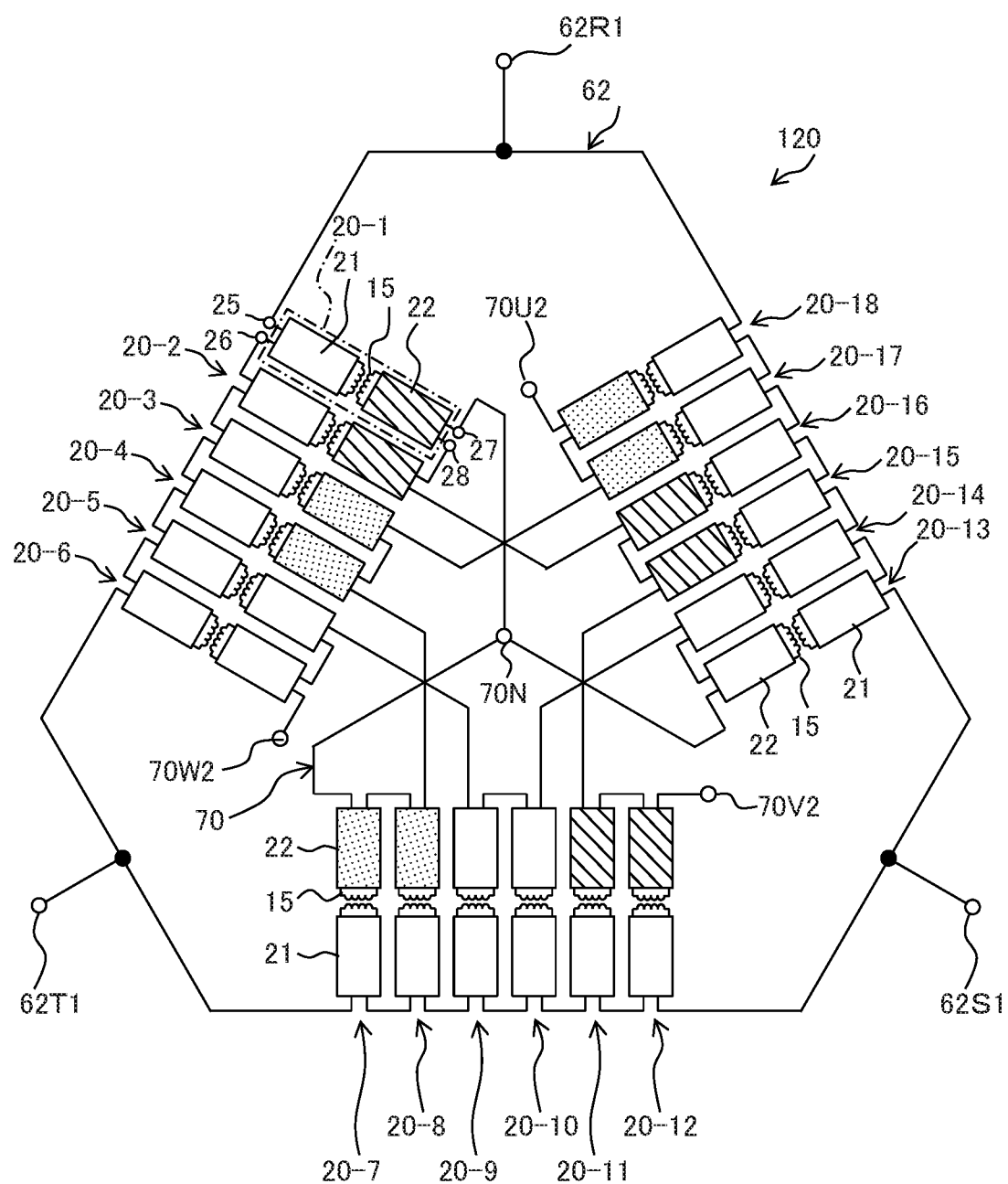
FIG. 13 is a block diagram of a power conversion device according to a fifth embodiment of the present invention.
Figure 14:
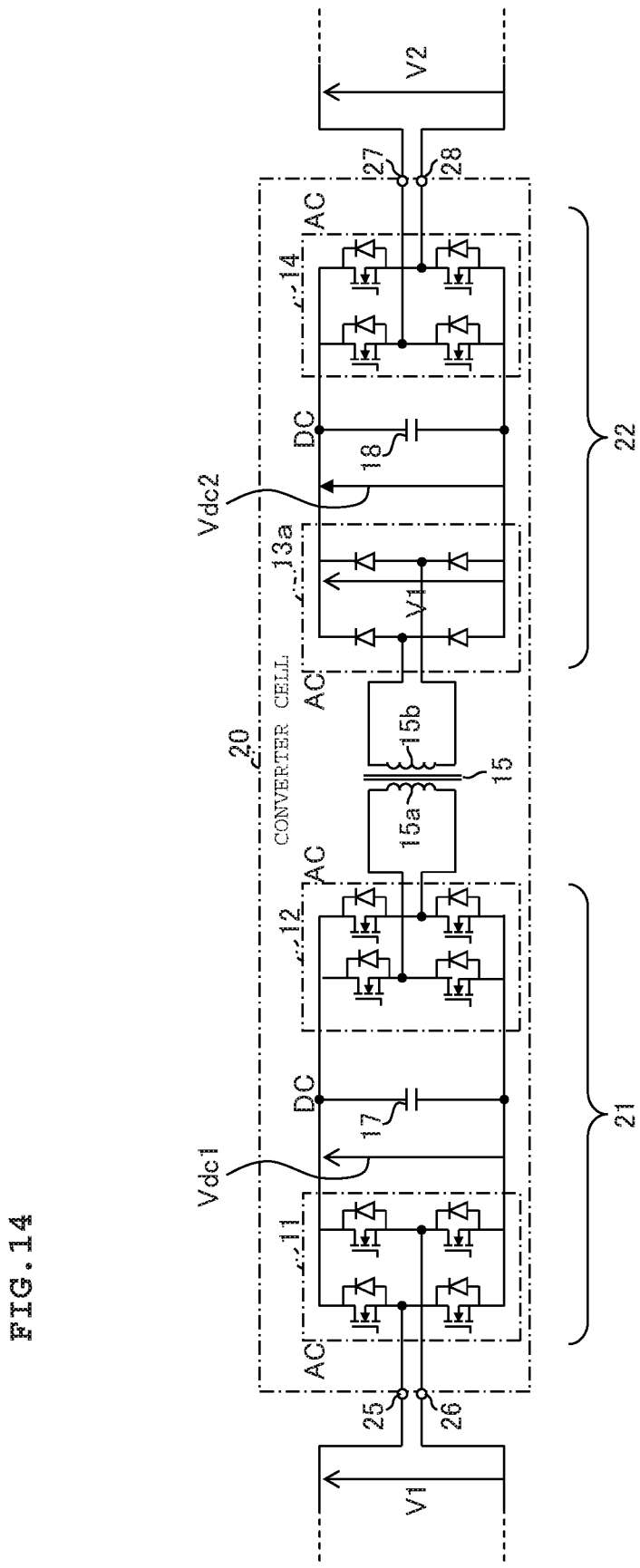
FIG. 14 is a block diagram of a modification of the converter cell.

FIG. 13 is a connection diagram of a power conversion device 120. The power conversion device 120 includes eighteen converter cells 20-1 to 20-18 similar to the power conversion device of the fourth embodiment (refer to FIG. 12). A configuration of each of the converter cells 20-1 to 20-18 is similar to that of the first embodiment (refer to FIG. 2). The power conversion device 120 bidirectionally or unidirectionally converts power between a primary-side system 62 and the secondary-side system 70 both of which are three-phase AC systems.

Herein, similar to the example in FIG. 12, the primary-side system 62 includes an R-phase line 62R1, an S-phase line 62S1, and a T-phase line 62T1 in which the R-phase voltage, the S-phase voltage, and the T-phase voltage respectively appear. Further, a configuration of the secondary-side system 70 is similar to that of the first embodiment. The primary-side terminals 25 and 26 of the converter cells 20-1 to 20-6 (refer to FIG. 2) are sequentially connected in series between the R-phase line 62R1 and the T-phase line 62T1. Similarly, the primary-side terminals of the converter cells 20-7 to 20-12 are sequentially connected in series between the T-phase line 62T1 and the S-phase line 62S1. Similarly, the primary-side terminals 25 and 26 of the converter cells 20-13 to 20-18 are sequentially connected in series between the S-phase line 62S1 and the R-phase line 62R1.

A connection relationship between the secondary-side terminals 27, 28 of each converter cell 20 and the secondary-side system 70 is similar to that of the first embodiment. As described above, the power conversion device 120 connects the primary-side system 62 and the secondary-side system 70 with a Δ-Y connection (delta-Y junction). According to the fifth embodiment, the effect similar to that of the fourth embodiment can be exerted, and an application range can be expanded because the fifth embodiment can also be applied to a primary-side system 62 of a three-phase three-line type, which has no neutral line.

Note that in the above example, the Y connection is used on the primary-side and the Δ connection is used on the secondary-side. However, the Δ connection may be used on the primary-side and the Y connection may be used on the secondary-side.

Also for those configurations, the control method based on the relationship with respect to various voltages and currents on the secondary-side and the expressions (13) to (18) is effective, similar to the third embodiment.

The effect similar to that of the first embodiment can also be obtained with the fifth embodiment.

Note that since the power supply on the primary-side includes DC quantity, the present invention is not applicable.

Sixth Embodiment

Next, a configuration of a power conversion device 130 according to a sixth embodiment will be described.

Figure 17:
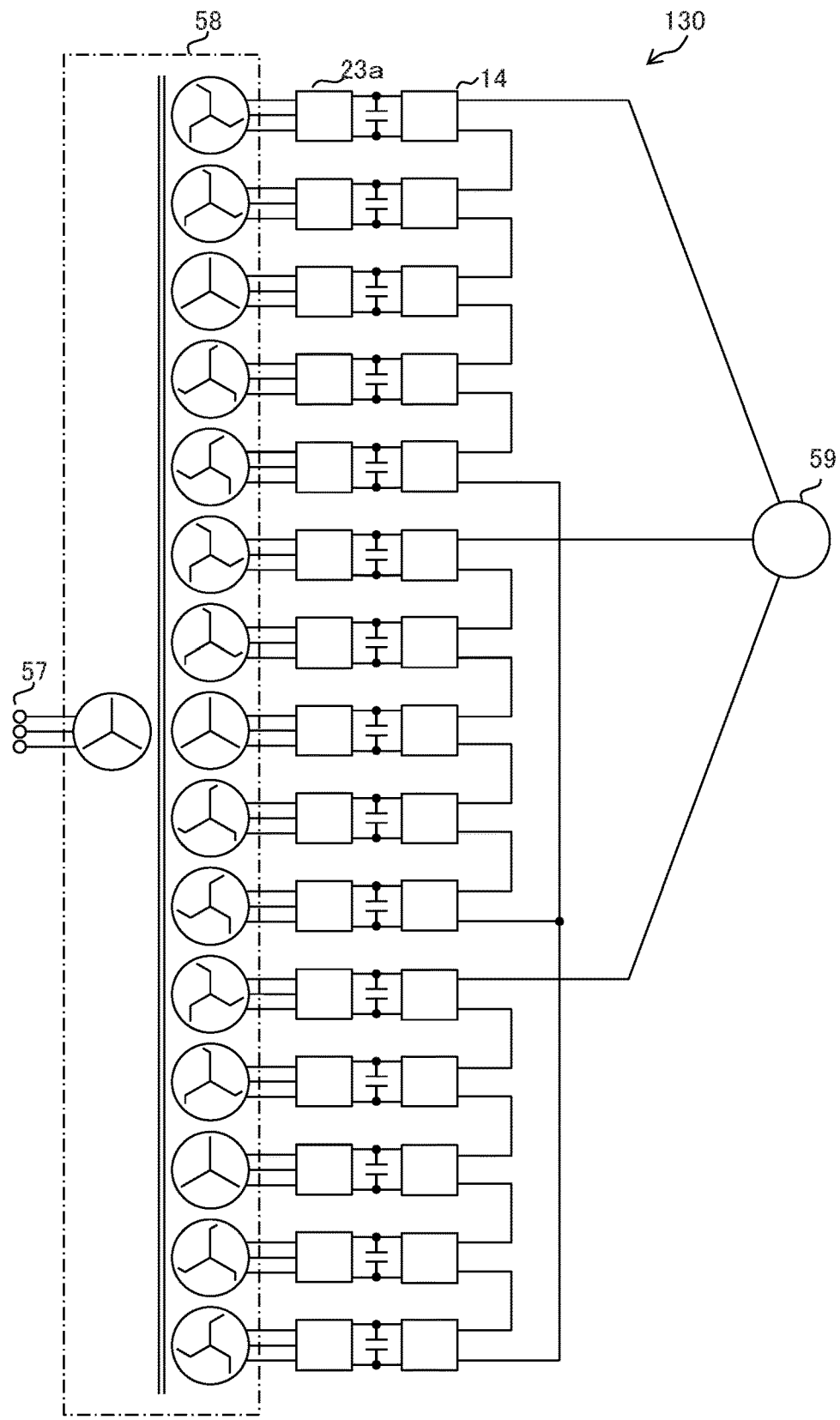
FIG. 17 is a block diagram of a power conversion device according to a sixth embodiment of the present invention.
Figure 18:
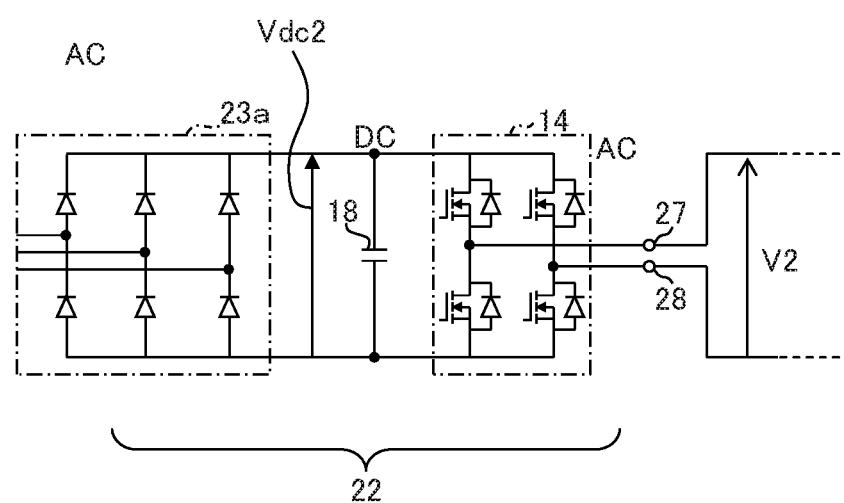
FIG. 18 is a block diagram (circuit diagram) of a converter cell according to the sixth embodiment.

FIG. 17 is a connection diagram of the power conversion device 130. The power conversion device 130 includes fifteen converter cells similar to those in the fourth embodiment (refer to FIG. 12). A configuration of each converter cell 20 is similar to the example illustrated in FIG. 18. The power conversion device 130 unidirectionally converts power between a primary-side system 57 and a secondary-side system 59 both of which are three-phase AC systems. Each converter cell is configured with an AC-DC converter 23*a* connected to a multiple transformer 58, and an AC-DC converter 14 (a fourth AC-DC converter, a secondary-side converter), and the AC-DC converter 23*a* includes a three-phase diode bridge.

Also for the sixth embodiment, the control method based on the relationship with respect to various voltages and currents on the secondary-side and the expressions (13) to (18) is effective, similar to the third embodiment.

The effect similar to that of the first embodiment can also be obtained with the sixth embodiment.

Note that since the power supply on the primary-side is of a multiple transformer type, the present invention is not applicable.

Modifications

The present invention is not limited to the above-described embodiments, and various modifications can be achieved. The above-described embodiments are exemplified for explaining the present invention so as to be understood easily, and are not necessarily limited to a power conversion device including all described configurations. A part of configuration of a certain embodiment can be replaced with a configuration of another embodiment, and a configuration of a certain embodiment can be added with a configuration of another embodiment. A part of configuration of each embodiment can be deleted, or can be added or replaced with another configuration. The control lines and the information lines illustrated in the drawings are those considered necessary for the explanation, and all control lines and information lines necessary for a product are not necessarily illustrated. It can be considered that almost all configurations are mutually connected in fact. The modifications that are applicable to the above-described embodiments are as follows, for example.

(1) In each embodiment described above, an example in which the MOSFETs are applied as the switching elements $Q_1$ to $Q_4$ is described. However, as the switching element, an IGBT (Insulated Gate Bipolar Transistor), a bipolar transistor, a thyristor, a GTO (Gate Turn-Off Thyristor), an IEGT (Injection Enhanced Gate Transistor), or a vacuum-tube type element such as a thyratron may be applied. Further, in a case where a semiconductor is applied, any material such as Si, SiC, or GaN can be applied.

Figure 15:
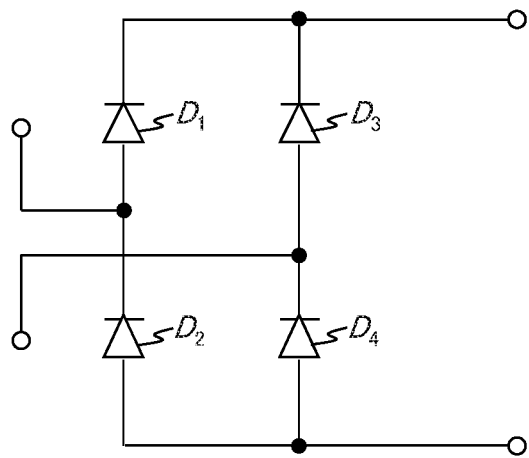
FIG. 15 is a circuit diagram of an H-bridge applied to the modification.

(2) The H-bridges using switching elements are applied to the AC-DC converter 11 to 14 in each embodiment described above for enabling bidirectional power conversion. However, in a case where unidirectional power conversion is only required, the H-bridges using rectifying elements may partly be applied to the AC-DC converters 11 to 14. An example of a circuit diagram of the H-bridge applied with rectifying elements $D_1$ to $D_4$ is illustrated in FIG. 15.

Figure 16A:
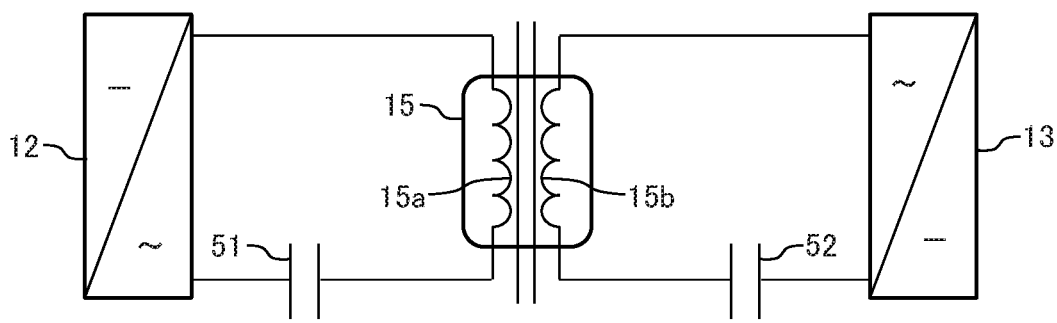
FIG. 16A is a circuit diagram of a periphery of a high-frequency transformer applied to another modification.
Figure 16B:
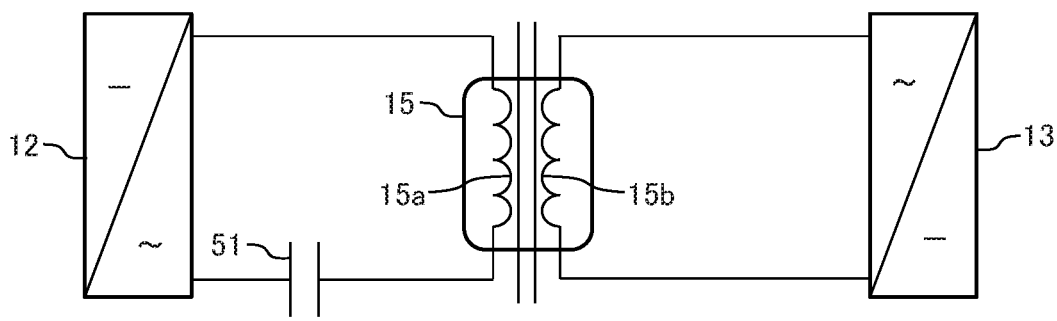
FIG. 16B is a circuit diagram of a periphery of the high-frequency transformer applied to still another modification.
Figure 16C:
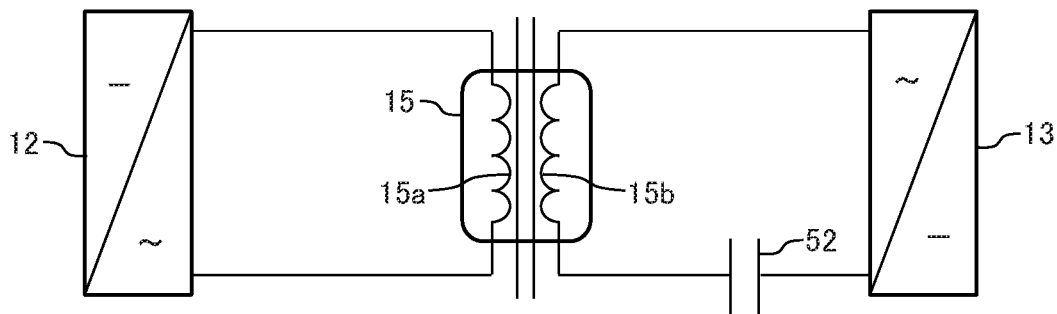
FIG. 16C is a circuit diagram of a periphery of the high-frequency transformer applied to still another modification.

FIG. 16A, FIG. 16B, and FIG. 16C are block diagrams of modifications of the converter cell 20. The AC-DC converters 11 to 14 illustrated in FIG. 2 are applied with the H-bridges using the switching elements for enabling bidirectional power conversion. However, in a case where unidirectional power conversion is only required, the H-bridges using the rectifying elements may partly be applied to the AC-DC converters 11 to 14. In the configuration illustrated in FIG. 15, as an example, the AC-DC converter 13 in FIG. 2 is replaced with an AC-DC converter using four rectifying elements.

Also in the present modification, a transformer potential difference $V_{tr}$ of the high-frequency transformer 15 (refer to FIG. 2) is similar to that in each embodiment described above, and therefore the power conversion device can be configured with a small size and low cost. The rectifying elements $D_1$ to $D_4$ may be semiconductor diodes, or mercury arc rectifiers of a vacuum-tube type, for example. In a case where a semiconductor is applied, any material such as Si, SiC, or GaN can be applied.

(3) In each embodiment described above, capacitors may be inserted between the AC-DC converter 12 and the transformer 15 and between the transformer 15 and the AC-DC converter 13. FIG. 16A illustrates an example in which a capacitor 51 is inserted between the AC-DC converter 12 and the primary winding 15a, and a capacitor 52 is inserted between the AC-DC converter 13 and the secondary winding 15b.

FIG. 16B illustrates an example in which the capacitor 51 is inserted between the AC-DC converter 12 and the primary winding 15a, and FIG. 16C illustrates an example in which the capacitor 52 is inserted between the AC-DC converter 13 and the secondary winding 15b.

As the high-frequency transformer 15 applied to each embodiment described above, a transformer that is designed to intentionally generate leakage inductance may be used.

DESCRIPTION OF REFERENCE CHARACTERS 1, 101, 110, 120, 130, 300: Power conversion device
11: AC-DC converter (first AC-DC converter, primary-side converter)
12: AC-DC converter (second AC-DC converter, primary-side converter)
13: AC-DC converter (third AC-DC converter, secondary-side converter)
14: AC-DC converter (fourth AC-DC converter, secondary-side converter)
15: High-frequency transformer (transformer)
15a: Primary winding
15b: Secondary winding
20: Converter cell (power conversion cell)
20-1 to 20-N: Converter cell
20-1, 20-2: Converter cell (first power conversion cell)
20-3, 20-4: Converter cell (second power conversion cell)
20-5, 20-6: Converter cell (third power conversion cell)
20-7, 20-8: Converter cell (fourth power conversion cell)
20-9, 20-10: Converter cell (fifth power conversion cell)
20-11, 20-12: Converter cell (sixth power conversion cell)
20-13, 20-14: Converter cell (seventh power conversion cell)
20-15, 20-16: Converter cell (eighth power conversion cell)
20-17, 20-18: Converter cell (ninth power conversion cell)
21: Primary-side circuit
22: Secondary-side circuit
25, 26: Primary-side terminal
27, 28: Secondary-side terminal
31: Primary-side power supply system
32: Secondary-side power supply system
40-1 to 40-N: Converter cell
45, 46: Primary-side terminal
61: Primary-side DC power supply system (primary-side power supply system)
60, 62: Primary-side system
70: Secondary-side system
$V_{dc1}$: Primary-side DC link voltage (primary-side DC voltage)
$V_{dc2}$: Secondary-side DC link voltage (secondary-side DC voltage)

The invention claimed is:
1. A power conversion device comprising:
a plurality of power conversion cells that are connected to each other and convert a primary-side system voltage into a secondary-side system voltage;
a capacitor connected to each of the plurality of power conversion cells; and a power conversion cell driver that drives the plurality of power conversion cells to add a 3N order higher-harmonic-wave voltage of each of alternating voltages of the plurality of power conversion cells to the each of the alternating voltages, and output a voltage made by adding the each of the alternating voltages and the 3N order higher-harmonic-wave voltage, when N is a natural number.

2. The power conversion device according to claim 1, wherein
amplitude of the 3N order higher-harmonic-wave voltage is approximately ½ of amplitude of a fundamental wave of the each of the alternating voltages.

3. The power conversion device according to claim 1, wherein
a phase delay of the 3N order higher-harmonic-wave voltage is approximately twice of a power factor angle of the fundamental wave of the each of the alternating voltages.

4. The power conversion device according to claim 1, wherein
the each of AC voltages is ground potential of an alternating neutral point voltage, and
each of the plurality of power conversion cells is driven to output a voltage made by adding a voltage which includes a third order higher-harmonic wave, and whose amplitude is approximately ½ of phase-voltage fundamental wave amplitude, to the ground potential.

5. The power conversion device according to claim 1, wherein
the primary-side system voltage and the secondary-side system voltage are alternating voltages,
the each of the plurality of power conversion cells includes:
a first AC-DC converter that converts the alternating voltage that is the primary-side system voltage into a direct voltage;
a second AC-DC converter that converts the direct voltage that is converted by the first AC-DC converter into the AC voltage;
a third AC-DC converter that converts the alternating voltage that is converted by the second AC-DC converter, into the direct voltage;
a fourth AC-DC converter that converts the direct voltage that is converted by the third AC-DC converter into the alternating voltage, and supplies the alternating voltage to the secondary-side power supply system; and
a high-frequency transformer connected between the second AC-DC converter and the third AC-DC converter 13, and
the capacitor includes:
a first capacitor connected between the first AC-DC converter and the second AC-DC converter; and
a second capacitor connected between the third AC-DC converter and the fourth AC-DC converter.

6. The power conversion device according to claim 1, wherein
the primary-side system voltage is a direct voltage, and the secondary-side system voltage is an alternating voltage,
the each of the plurality of power conversion cells includes:
a second AC-DC converter that converts the direct voltage that is the primary-side system voltage into the alternating voltage;
a third AC-DC converter that converts the alternating voltage that is converted by the second AC-DC converter into the direct voltage;
a fourth AC-DC converter that converts the direct voltage converted by the third AC-DC converter into the AC voltage, and supplies the alternating voltage to the secondary-side power supply system; and
a high-frequency transformer connected between the second AC-DC converter and the third AC-DC converter 13, and
the capacitor includes:
a first capacitor that is supplied with the primary-side voltage, and is connected to the second AC-DC converter; and
a second capacitor connected between the third AC-DC converter and the fourth AC-DC converter.

7. The power conversion device according to claim 1, wherein
the primary-side system voltage and the secondary-side system voltage are three-phase alternating voltages, and
the plurality of power conversion cells include a Y-connected primary-side circuit and a Y-connected secondary-side circuit that are disposed for each phase of the three-phase alternating voltages.

8. The power conversion device according to claim 1, wherein
the primary-side system voltage and the secondary-side system voltage are three-phase alternating voltages, and
the plurality of power conversion cells include a delta-connected primary-side circuit and a Y-connected secondary-side circuit that are disposed for each phase of the three-phase alternating voltages.

* * * * *